United States Patent
Sarma et al.

(10) Patent No.: US 7,562,303 B2
(45) Date of Patent: Jul. 14, 2009

(54) DISPLAYING USERS CONNECTED TO COMPUTER SERVERS

(75) Inventors: Kanchuki Sarma, Kirkland, WA (US); Mai-lan Tomsen Bukovec, Seattle, WA (US); Eric B. Watson, Redmond, WA (US); Ryan Randal Elliott, Bothell, WA (US); Eric C. Kool-Brown, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 463 days.

(21) Appl. No.: 11/395,462

(22) Filed: Mar. 30, 2006

(65) Prior Publication Data

US 2007/0233853 A1    Oct. 4, 2007

(51) Int. Cl.
    *G06F 3/00*    (2006.01)
(52) U.S. Cl. .................... 715/736; 715/734; 715/733
(58) Field of Classification Search ............... 715/733, 715/734, 736; 709/203, 201, 223, 224
    See application file for complete search history.

(56) References Cited

U.S. PATENT DOCUMENTS

| | | | | |
|---|---|---|---|---|
| 5,887,139 A | * | 3/1999 | Madison et al. | 709/223 |
| 6,040,834 A | * | 3/2000 | Jain et al. | 715/853 |
| 6,189,032 B1 | * | 2/2001 | Susaki et al. | 709/225 |
| 6,460,084 B1 | * | 10/2002 | Van Horne et al. | 709/227 |
| 6,505,232 B1 | * | 1/2003 | Mighdoll et al. | 709/227 |
| 2003/0131092 A1 | * | 7/2003 | McGee et al. | 709/224 |
| 2004/0010584 A1 | * | 1/2004 | Peterson et al. | 709/224 |

OTHER PUBLICATIONS

Microsoft Corporation, "Windows Small Business Server 2003: Frequently Asked Questions," <http://www.microsoft.com/windowsserver2003/sbs/techinfo/overview/generalfaq.mspx>, 20 pages (accessed Jan. 30, 2006).

Microsoft Corporation, "Windows Small Business Server 2003 Big Breakthroughs for Small Businesses," <http://rad.microsoft.com/ADSAdClient31.dll?GetAd=&PG=CMSSB1&SC=F3&AP=1164>, 35 pages (accessed Jan. 30, 2006).

Hewlett-Packard Development Company, "Instructions for installing Microsoft Windows Small Business Server 2003 with Service Pack 1 on HP ProLiant and tc servers," <http://h20000.www2.hp.com/bc/docs/support/SupportManual/c00208458/c00208458.pdf>, 12 pages (accessed Jan. 30, 2006).

* cited by examiner

*Primary Examiner*—Kieu D Vu
(74) *Attorney, Agent, or Firm*—Klarquist Sparkman, LLP

(57) ABSTRACT

User connection information can be displayed. User connection information can represent user connections to a plurality of computer servers of a multi-server system. User connection information can be received from a plurality of computer servers, user details can be obtained, and a representation of the user connection information for the plurality of computer servers can be displayed. Users connected to computer servers can be notified by displaying a representation of user connection information, displaying a user-notification task, receiving a selection of the user notification task, and notifying the users of an event. User connection information can be retrieved and displayed by retrieving user connection information from a plurality computer servers of a multi-server system, storing the retrieved user connection information, and displaying a representation of the user connection information based on the stored user connection information.

16 Claims, 18 Drawing Sheets

TASK TEMPLATE SCHEMA

- TASK NAME
- UNIQUE IDENTIFIER
- GROUP
- SOURCE
- LOCATION
- AUXILIARY 1
- AUXILIARY 2

1410

DISPLAYING USERS CONNECTED TO COMPUTER SERVERS

BACKGROUND

Despite advances in technology, displaying user activity on a computer network can be difficult. For example, a user of a computer network, such as an IT administrator, can be responsible for managing a computer network. Part of the administrator's duties can involve responding to problems, such as user problems reported by users of the computer network. Responding to such user problems can consume a significant amount of the administrator's time.

In responding to user problems, the administrator may want to know which aspects of the computer network, such as which services, the user is using to try and identify the source of the problem. The administrator may ask the user for such information, but the information provided by the user may not help the administrator determine which aspects of the computer network the user is using. The administrator may try to determine which aspects the user is using in other ways, such as accessing various applications on the computer network, but the administrator may not know which applications to access or which user interfaces in which applications to access. This can be a time-consuming an inefficient process.

Therefore, there exists ample opportunity for improvement in technologies related to displaying user activity on a computer network.

SUMMARY

A variety of technologies related to displaying users connected to computer servers can be applied. Such technologies can be used for displaying user connection information for a multi-server system. For example, user connection information representing user connections to computer servers of the multi-server system can be received. After receiving the user connection information, user details can be obtained. A representation of the user connection information representing user connections to the computer servers can be displayed.

User connection information (e.g., comprising start and end times for user connections to computer servers) can be persistently stored (e.g., at a management computer server).

Such technologies can be used to notify users connected to computer servers. For example, user connection information representing users connected to computer servers (e.g., of a multi-server system) can be displayed. In addition, a user-notification task can be displayed for causing users connected to the computer servers to be notified of an event. A selection of the user-notification task can be received, and in response the users can be notified of the event.

Such technologies can also be used for retrieving and displaying user connection information for users connected to computer servers of a multi-server system. For example, user connection information can be retrieved from multiple computer servers and stored (e.g., at a management computer server). A representation of the user connection information can then be displayed (e.g., in a user interface of a management application running on the management computer server) using the stored information.

User connection information can be received and retrieved on a regular basis defined by a schedule (e.g., automatically based on the schedule). Users connected to computer servers (e.g., a selected computer server) can be notified (e.g., via email).

The foregoing and other objects, features, and advantages of the invention will become more apparent from the following detailed description, which proceeds with reference to the accompanying figures.

DETAILED DESCRIPTION OF EXEMPLARY EMBODIMENTS

EXAMPLE 1

Exemplary Task

Figure 1:
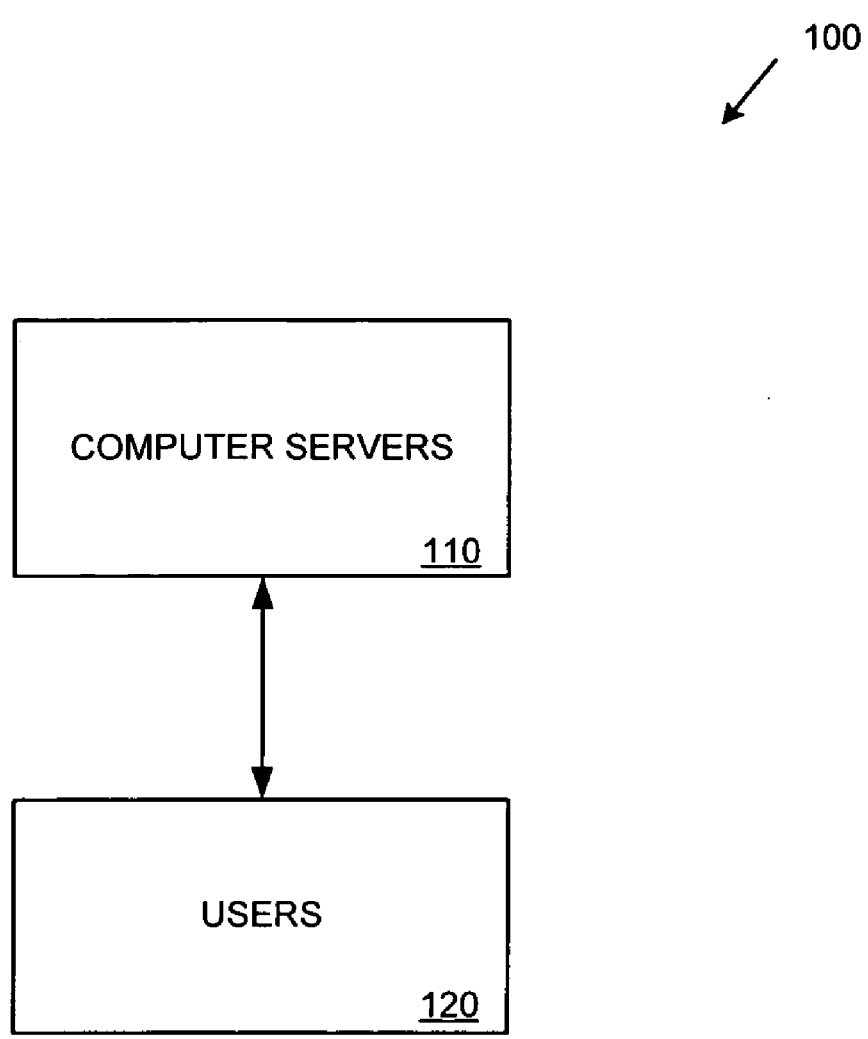
FIG. 1 is a diagram showing an exemplary system supporting user connections.

In any of the examples herein, a task can represent work that is performed on a computer network (e.g., a multi-server computer system or environment of a business or organization). For example, a task can represent the retrieval of information that is displayed to a user of the network (e.g., for troubleshooting purposes). A task can represent making a change to the network (e.g., changing settings in an application). A task can also represent initiating a communication on the network (e.g., sending a notification or message to a user of the network). A task can be performed, for example, by using a task template. For display purposes, a user interface element (e.g., a button or link) can be displayed for initiating a task.

Selecting (e.g., invoking) a task can result in displaying a user interface for accomplishing (e.g., completing) the task. For example, selecting a task can result in display of a user interface of an application (e.g., using a task template associated with the selected task and identifying the user interface).

Selecting a task can result in display of various types of user interfaces. For example, a wizard user interface can be displayed (e.g., where the user is directed through a series of steps). A dialog can be displayed (e.g., the user can be asked to confirm the deletion of a user account). A view can also be displayed (e.g., a page allowing the user to configure various settings, such as web site settings).

EXAMPLE 2

Exemplary Task Template

In any of the examples herein, a task template can be used to accomplish (e.g., complete) a task. For example, a task template can be used to direct a user to a user interface of an application for accomplishing a task. For example, a task template can comprise a location variable or location field. The location variable or field can contain a location. The location can represent (e.g., be an address of) a user interface (e.g., a specific user interface such as a specific wizard, dialog, or view user interface). For example, the location can represent a user interface by way of an API of an application (e.g., a managed application). A task template can be in the format of a schema (e.g., an XML or XrML schema).

A task template can also be stored in a variety of ways and in a variety of locations. For example, task templates can be stored as data values in a tasks database (e.g., on a computer server). Task templates can also be stored as schemas (e.g., in a database, file, data store, or in another data storage location), such as an XML or XrML schema.

A task template can be updated. For example, a new task template can be downloaded to allow a user to accomplish the new task associated with the new task template. A task template can be downloaded in order to replace an existing task template (e.g., to provide updated functionality or to support a change to an application identified by a location variable of the task template). A task template can also be deleted or removed (e.g., from a tasks database on a computer server).

A task template can be used when a task is selected (e.g., invoked). For example, a task to add a new user to a network can be selected. In response, a location variable from a task template related to, or associated with, the task can be used to display a user interface identified by the location variable.

One or more task templates can be related to, or associated with, a task. For example, a task such as "troubleshoot network" can be associated with multiple task templates (e.g., a task template for displaying a user interface containing a list of error events associated with the network, a task template for displaying a user interface for restarting a computer server, or a task template for displaying a user interface for configuring settings of a network service). If multiple task templates are associated with a task, then when the task is selected one of the task templates can be chosen based on various parameters.

Selecting (e.g., invoking) or displaying a task template can comprise selecting or displaying an instance of the task template (e.g., displaying a user interface for accomplishing a task). An instance of a task template can be a specific occurrence of the task template. For example, a first instance of a task template can be displayed when a task template is selected (e.g., from a global task), and based on a location variable from the task template, a user interface of an application is displayed. A second instance of the same task template can also be displayed when the task template is selected (e.g., from a scoped task). In this way, multiple instances of the same task template can be selected and displayed.

The same task can be selected multiple times and multiple instances of the same task template displayed (e.g., at different times or at the same time). For example, an add user task can be selected multiple times and multiple instances of an add user task template can be displayed (e.g., multiple windows in a user interface, each window comprising fields for adding a user, such as: user name, logon name, and password).

Or, different tasks can be selected and multiple instances of the same task template displayed. For example, an edit user task for a specific user can be selected and an instance of an edit user template can be displayed (e.g., filled in with the specific user's information). An edit user task for a different specific user can also be selected and an instance of the same edit user template can be displayed (e.g., filled in with the different specific user's information).

EXAMPLE 3

Exemplary Object

In any of the examples herein, an object can be an entity, entity group, task, or another type of item associated with a computer network. For example, an object can be a computer (e.g., a desktop, laptop, or server), a user, a printer, a network device (e.g., switch, hub, or router), a configuration setting, a license, a solution, or a group or collection of such items (e.g., a group of computer servers).

Tasks can be performed on an object. For example, a list of tasks associated with a selected object (e.g., scoped tasks) can be displayed. A task from the list of tasks can be selected and, using an associated task template, a user interface can be displayed for completing the task.

EXAMPLE 4

Exemplary Entity

In any of the examples herein, an entity can be a single item associated with a computer network. For example, an entity can be a computer (e.g., a desktop, laptop, or server), a user, a printer, a network device (e.g., switch, hub, or router), a configuration setting, a license, or any other type of entity. Entities can be grouped together in entity groups.

Tasks can be performed on an entity. For example, an entity can be selected (e.g., by a user in a user interface). Selecting an entity (e.g., clicking or right-clicking on an icon representing the entity in a user interface) can display a list of tasks (e.g., a list of user interface elements for initiating the tasks). The list of tasks can be associated with the entity. A task from the list of tasks can be selected and, using an associated task template, a user interface can be displayed for completing the task.

EXAMPLE 5

Exemplary Entity Group

In any of the examples herein, an entity group can comprise a collection of entities. The collection of entities can be homogeneous or heterogeneous. For example, a homogeneous users entity group can comprise a collection of user entities. A heterogeneous email entity group can comprise a collection of entities that participate in email activities, such as: users, email servers, client email applications, and server email applications.

The collection of entities can be related. For example, a network entity group can comprise a collection of entities related to the network (e.g., servers, user computers, printers).

Tasks can be performed on an entity group. For example, an entity group can be selected (e.g., by a user in a user interface). Selecting an entity group (e.g., clicking on an icon representing the entity group) can display a list of tasks (e.g., a list of user interface elements for initiating the tasks). The list of tasks can be associated with the entity group. A task from the list of tasks can be selected and, using an associated task template, a user interface can be displayed for completing the task. For example, selecting a network entity group can display a task for viewing bandwidth usage across the network (e.g., across the entities comprising the network entity group).

EXAMPLE 6

Exemplary Scoped Task

In any of the examples herein, a task can be scoped. A scoped task can be a task that is associated with a selected object, entity, or entity group (e.g., the task applies to or will be performed on the selected object, entity, or entity group). For example, if a user is presented with a user interface displaying a number of entity groups, the user can select one of the entity groups. Once the user has selected one of the entity groups, a list of scoped tasks can be displayed (e.g., a list of user interface elements for initiating the scoped tasks). The list of tasks is scoped because it is associated with the selected entity group. For example, if the user selects a network entity group, the list of scoped tasks would be associated to the network entity group. An example of scoped tasks associated with a network entity group can be: view performance, view alerts, and view events.

Similarly, for example, if a user is presented with a user interface displaying a number of entities, the user can select one of the entities. Once the user has selected one of the entities, a list of scoped tasks can be displayed. The list of tasks is scoped because it is associated with the selected entity (e.g., the tasks apply to or will be performed on the selected entity). For example, if the user selects a specific computer server from a computer servers entity group, the list of scoped tasks would be associated with the specific computer server. An example of scoped tasks associated with a specific computer server entity can be: approve updates, configure web server, deploy new software package, view performance, view alerts, and view events. For example, the approve updates scoped task can allow a user to approve updates for the selected computer server entity.

EXAMPLE 7

Exemplary Global Task

In any of the examples herein, a task can be a global task. A global task can be a task that is displayed (e.g., as a user interface element for initiating the global task) regardless of whether an object, entity, or entity group is selected (e.g., a global task is not tied to the display of an object, entity, or entity group). Therefore, global tasks can be displayed independently of scoped tasks.

For example, a user can be presented with a user interface in which there are no objects, entities, or entity groups selected. A list of global tasks can be displayed in the user interface. For example, the list of global tasks can include: configure firewall settings, approve updates on server 1, review email license usage, and view file server performance.

Global tasks can also be displayed at the same time (e.g., simultaneously, concurrently, contemporaneously) as scoped tasks. For example, a list of global tasks can be displayed in a user interface (where there are no objects, entities, or entity groups selected). A user can then select an object, entity, or entity group which causes display (e.g., in a separate area of the user interface) of a list of scoped tasks. The list of global tasks can have a label identifying the list, as can the list of scoped tasks. The global tasks and scoped tasks can also be mixed (e.g., in a single list of tasks).

Displaying a list of scoped tasks can cause a list of global tasks to be removed (e.g., from being displayed in a user interface). For example, if a user selects an object, entity, or entity group, then a currently displayed list of global tasks can be removed and a list of scoped tasks displayed instead (e.g., replaced by the list of scoped tasks in the same area of the user interface, or in a different area of the user interface).

EXAMPLE 8

Exemplary Management Application

In any of the examples herein, a management application can be an application (e.g., a server application) that is used to manage the operations of a multi-server computer system (e.g., a computer system providing services to a business or organization). A management application can run on a management computer server (e.g., a management computer server of the multi-server system). A management application can display one or more user interfaces. A user of the management application can manage the operations of the multi-server computer system via the user interfaces of the management application (e.g., by selecting tasks displayed in the user interfaces). The tasks can be used to manage computer servers and applications of the multi-server computer system.

EXAMPLE 9

Exemplary User Connection Information

In any of the examples herein, user connection information can represent connections between users and computer servers (e.g., between users and computer servers of a multi-server system of a business or organization). For example, user connection information can represent connections between users and services (e.g., email services, backup services, licensing services, fax services, web services, anti-spam services, and anti-virus services) provided by computer servers, and between users and resources (e.g., file shares, printers, and the like) provided by computer servers. User connection information can also represent user sessions with (e.g., logins to) computer servers (e.g., locally or remotely).

For example, if a user of a computer network (e.g., a multi-server system) runs a client email application on the user's computer, then a connection is created between the user's client email application and an email service running on a computer server (e.g., an email server) of the computer network. If the user accesses a file share on a computer server (e.g., a file server), then a connection can be created between the user and the file share resource provided by the computer server. The user can also logon to a computer server of the computer network (e.g., by physically going to the server's console or by remote access) thus creating a connected session to the computer server.

User connection information can represent connections in a variety of ways. For example, connections can be represented as associations between users and services, resources, and sessions (e.g., login sessions). Users can be represented by unique user identifiers. Similarly, services, resources, and sessions (e.g., logins to specific computer servers) can be represented by unique service, resource, and server identifiers. For example, user connection information can contain a list of users (represented by unique user identifiers) and, for each user in the list, the services, resources, and sessions (e.g., represented by names or unique identifiers) associated with that user. In this way, a user can be associated with any number (zero or more) of services, resources, and sessions representing connections of the user to different services and computers.

User connections can also be represented as an individual numeric item or as a sum of items. For example, a user's client email application connection to an email server application can be represented as "one" connection. All connections to an email server can be summed to represent the number of connections; for example, "fifty". Because each of these connections also can be uniquely identified, a user (e.g., an IT administrator) can take action on either the number of connections (for example, wait until there are less connections to upgrade the email server application) or on the unique identifiers of the connections (for example, send an email to all connected users to warn that an upgrade is happening in 15 minutes).

User connection information can be stored. For example, user connection information can be stored in a persistent format, such as in a file or in a database (e.g., with specific date and time information to allow for auditing reports). The date and time information can capture the start of the connection and the end of the connection, which can allow for reports to be generated that calculate the length of time of the user connection to the computer server. Reports can be used to audit user connections to computer servers. User connection information can also be transmitted (e.g., transmitted between computer servers). For example, transmitted information can be used for display in a report on a remote computer server.

EXAMPLE 10

Exemplary Receiving User Connection Information

In any of the examples herein, user connection information can be received. For example, user connection information can be received at a computer server (e.g., a management computer server) of a multi-server system from other computer servers of the multi-server system. The computer server (e.g., management computer server) can be the central location for receiving the user connection information (e.g., the central location for receiving the user connection information of a multi-server system of a business or organization).

User connection information can be received at a computer server from a number of other computer servers via management agents. For example, the management agents can automatically collect user connection information from a number of servers and transmit the information to a central computer server (e.g., the management computer server). User connection information can also be received directly from other computer servers (e.g., by the management computer server).

The user connection information can be received on a periodic basis (e.g., at regular intervals based on a pre-set or user-defined schedule). For example, the user connection information can be received at a computer server from a number of other computer servers at regular intervals (e.g., based on a schedule), such as every 15 minutes, every 5 minutes, every minute, or every 5 seconds). Using a relatively short time interval (e.g., 10 minutes or less) can ensure that updated user connection information is available for use (e.g., display or notification). The interval can be adjusted (e.g., by an IT administrator adjusting interval rules) depending on various conditions (e.g., size of the computer network, network bandwidth conditions, and user preference).

Receiving user connection at a central location, such as a management computer server, can allow a user, such as an IT administrator, to view user connections across a multi-server system using a management application running on the management computer server. An aggregated view of user connections to the different servers gives the IT administrator a quick view into the usage of the system.

EXAMPLE 11

Exemplary Retrieving User Connection Information

In any of the examples herein, user connection information can be retrieved. For example, user connection information can be retrieved by a computer server (e.g., a management computer server) of a multi-server system from other computer servers of the multi-server system. The computer server (e.g., management computer server) can be the central location for collecting user connection information.

User connection information can be retrieved by a computer server from a number of other computer servers by polling the other computer servers. For example, the computer server can poll another computer server by connecting to the other computer server and obtaining user connection information related to, or held by, the other computer server (e.g., user connection information relating to connections by users to the other computer server). The computer server can then store the retrieved user connection information (e.g., in a database or file).

User connection information can be retrieved on a periodic basis (e.g., by polling computer servers at regular intervals based on a pre-set or user-defined schedule). For example, user connection information can be retrieved by a computer server from a number of other computer servers at regular intervals (e.g., based on a schedule), such as every 15 minutes, every 5 minutes, every minute, or every 5 seconds). Using a relatively short time interval (e.g., 10 minutes or less) can ensure that updated user connection information is available for use (e.g., display or notification). The interval can be adjusted (e.g., by an IT administrator adjusting interval rules) depending on various conditions (e.g., size of the computer network, network bandwidth conditions, and user preference).

Retrieving user connection at a central location, such as a management computer server, can allow a user, such as an IT administrator, to view user connections across a multi-server system using a management application running on the management computer server. An aggregated view of user connections to the different servers gives the IT administrator a quick view into the usage of the system.

EXAMPLE 12

Exemplary User Details

In any of the examples herein, user details can be obtained and used. A user detail can be any type of details (e.g., attribute, parameter) of a user (e.g., user name, logon name, password, email address, group associations, license associations, and the like).

User details can be obtained using unique user identifiers. For example, a unique user identifier (e.g., received by a computer server in user connection information) can be used to obtain user details regarding the user associated with the unique user identifier from a directory service (e.g., from an active directory service).

User details can be obtained after user connection information has been received at a computer server from a number of other computer servers (e.g., at the time the user connection information is displayed at the computer server). User details can be stored (e.g., along with user connection information or separately).

User details can be displayed. For example, when displaying user connection information, user details, such as user names, logon names, and email addresses, can be displayed to identify the users (e.g., user accounts) associated with various connections.

EXAMPLE 13

Exemplary Notification

In any of the examples herein, users connected to services, resources, or sessions of computer servers can be notified. For example, users can be notified of events. An event can be, for example, that a computer server to which the users are connected will be brought down for maintenance (e.g., a maintenance event). Events can also convey other types of information to users (e.g., that a new service or resource is available on a computer server).

Notifications can be sent to individual users or groups of users. For example, if a number of users are connected to a computer server, and the computer server is going to be shut down for maintenance, a notification can be sent to the connected users. If, for example, a single service on a computer server (e.g., an email service) is going to be shut down, then a notification can be sent to only those users connected to the email service on the computer server. Notifications can also be sent to all the users connected to a number of computer servers (e.g., if the number of computer servers will be shut down at the same time).

Notifying users can be accomplished in a variety of ways (e.g., email, alert, pop-up window, instant message, phone call, page). For example, a user interface of a management application can display a list of computer servers and the users connected to services, resources, or sessions for each computer server. If one of the computer servers is to be shut down by an IT administrator (e.g., for maintenance), the IT administrator can select the computer server in the user interface and select a task, such as a user-notification task, (e.g., by selecting a user interface element, such as a button or link, associated with the task) to notify all the users connected to the computer server of the pending shut down.

Notifications can be initiated manually or automatically. For example, a user (e.g., an IT administrator) can manually select a task to notify users connected to a computer server of an event (e.g., that the server is experiencing a problem and the users should stop using a specific service of the computer server). Alternatively, users can be notified automatically of an event (e.g., if a computer server, service, or resource is being shut down). For example, if a computer server is scheduled to shut down at a specific time (e.g., on a scheduled basis) then an automatic notification can be sent to connected users (e.g., at a specified time, such as 10 minutes) before the shut down is to occur).

EXAMPLE 14

Exemplary User-Notification Task

In any of the examples herein, a user-notification task can be a task for notifying users connected to services, resources, or sessions of computer servers. For example, a user-notification task can be displayed in a user interface of a management application running on a management computer server. A user-notification task can be displayed in a task list (e.g., a scoped task list or a global task list).

A user-notification task can be displayed in response to a selection of an entity group. For example, if a network entity group is selected in a user interface of a management application, then a user-notification task can be displayed. The user-notification task can be scoped to the network entity group such that when the user-notification task is selected, users connected to any of the computer servers of the network entity group will be notified (e.g., of an event concerning the computer network).

A user-notification task can be displayed in response to a selection of an entity. For example, a number of computer server entities can be displayed in a user interface of a management application. A selection of one of the computer server entities can be made, and in response a user-notification task can be displayed. The user-notification task can be scoped to the selected computer server such that when the user-notification task is selected, users connected to the services, resources, or sessions of the computer server entity will be notified (e.g., of an event concerning the selected computer server).

When a user-notification task is selected in a user interface (e.g., by selecting a user interface element, such as a button or link, associated with the user-notification task) the user-notification task can be accomplished using a task template. For example, a task template can comprise the location of a user interface from which the notification can be sent (e.g., the location of an email application user interface from which a user can enter information, such as a message, and send the email notification message).

EXAMPLE 15

Exemplary Displaying User Connection Information

In any of the examples herein, user connection information can be displayed in a user interface (e.g., as representations of the user connection information). For example, a list of computer servers can be displayed. For each computer server, a count of the number of users connected to the computer server (e.g., connected to a service, resource, or logged in to the computer server) can be displayed. In addition to, or instead of, the user count, individual users connected to the server can be displayed (e.g., by displaying logon names). Additional user information (e.g., user details) can be displayed. For example, logon names can be selected (e.g., they can be buttons or links). Selecting logon names can display (e.g., in a pop-up window or a details pane of the same window) additional user information (e.g., user details such as user name, email address, group associations, and license associations).

User connection information can also be displayed by displaying a list of users (e.g., represented by user information or user details such as user name, email address, and logon name). For each user in the list, user connections can be displayed. For example, if a specific user is connected to an email service and a file share on a specific computer server, the names of the email service and file share can be listed.

User connection information can also be displayed in other ways. For example, a topology view can be displayed graphically representing users and servers and the connections between them.

Displaying user connection information can allow a user (e.g., an IT administrator of a multi-server system) to quickly locate and diagnose problems. For example, a user can contact the IT administrator with a problem and the IT administrator can view a display of the user's current service, resource, and session connections. In this way, the IT administrator can narrow down the possible source or sources of the user's problem. The IT administrator can tell the user to disconnect from a service, resource, or session, or the IT administrator can use a management application to remotely disconnect the user from a service, resource, or session on a computer server, if necessary.

Displaying user connection information can also allow an IT administrator to notify users of various events (e.g., shutting down an email server for maintenance). For example, the IT administrator can view a display of the computer servers of the multi-server system. The IT administrator can select one of the servers, such as the email server, and select a task to notify the users connected to the server that the server will be going down for maintenance (e.g., in 5 minutes).

EXAMPLE 16

Exemplary System Supporting User Connections

FIG. 1 shows an exemplary system 100 supporting user connections. In the example, a number of computer servers 110 (e.g., part of a multi-server system) can provide various services and resources to a number of users 120 (e.g., users of the multi-server system). For example, the computer servers 110 can provide services (e.g., email services, backup services, licensing services, fax services, web services, anti-spam services, and anti-virus services) and resources (e.g., file shares and printers). The users 120 can connect to the various services and resources provided by the computer servers 110. In addition, the users 120 can logon to the computer servers 110 (e.g., directly or remotely).

EXAMPLE 17

Exemplary System for Displaying User Connection Information

Figure 2:
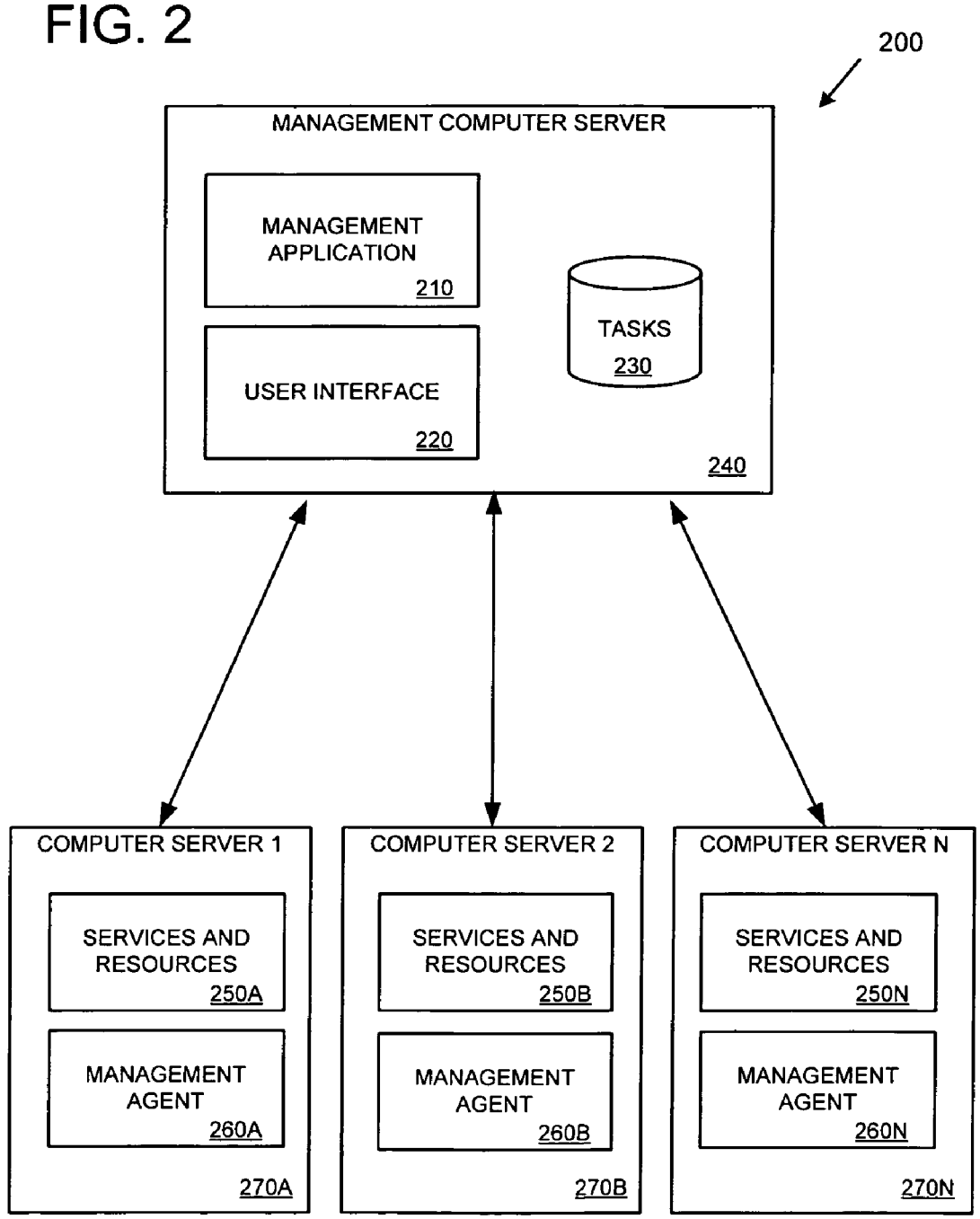
FIG. 2 is a diagram showing an exemplary system for displaying user connection information.

FIG. 2 shows an exemplary system 200 for displaying user connection information. The system 200 can be a multi-server system of a business or organization providing services and resources to the users of the business or organization.

In the example, a management application 210 is running on a management computer server 240. The management application 210 can be used to display user connection information in a user interface 220 at the management computer server 240. The management application 210 can also display user interfaces remotely (e.g., at a user's computer, such as an IT administrators computer).

The management application 210 can display tasks (e.g., user-notification tasks). The tasks can be selected to notify users of events (e.g., maintenance events). The tasks can be performed by task templates. Task templates can be stored in a tasks database 230 located on the management computer server 240. The task templates in the tasks database 230 can be stored in a format defined by a schema. The task templates can comprise a location variable or field. The location variable or field can identify a user interface of an application for accomplishing the task associated with the task template.

The management computer server 240 can receive user connection information from other computer servers (e.g., computer servers 270A-N). The user connection information can be received from management agents running on the other computer servers (e.g., from management agents 260A-N running on computer servers 270A-N).

The management computer server 240 can retrieve user connection information from other computer servers (e.g., computer servers 270A-N). The user connection information can be retrieved directly from the other computer servers 270A-N. The user connection information can also be retrieved by connecting to services running on the other computer servers 270A-N (e.g., connecting to APIs of the services).

Computer servers 270A-N can provide services and resources 250A-N to users of the computer servers. In addition, users can logon to the computer servers 270A-N (e.g., directly or remotely).

EXAMPLE 18

Exemplary Depiction of User Connections

Figure 3:
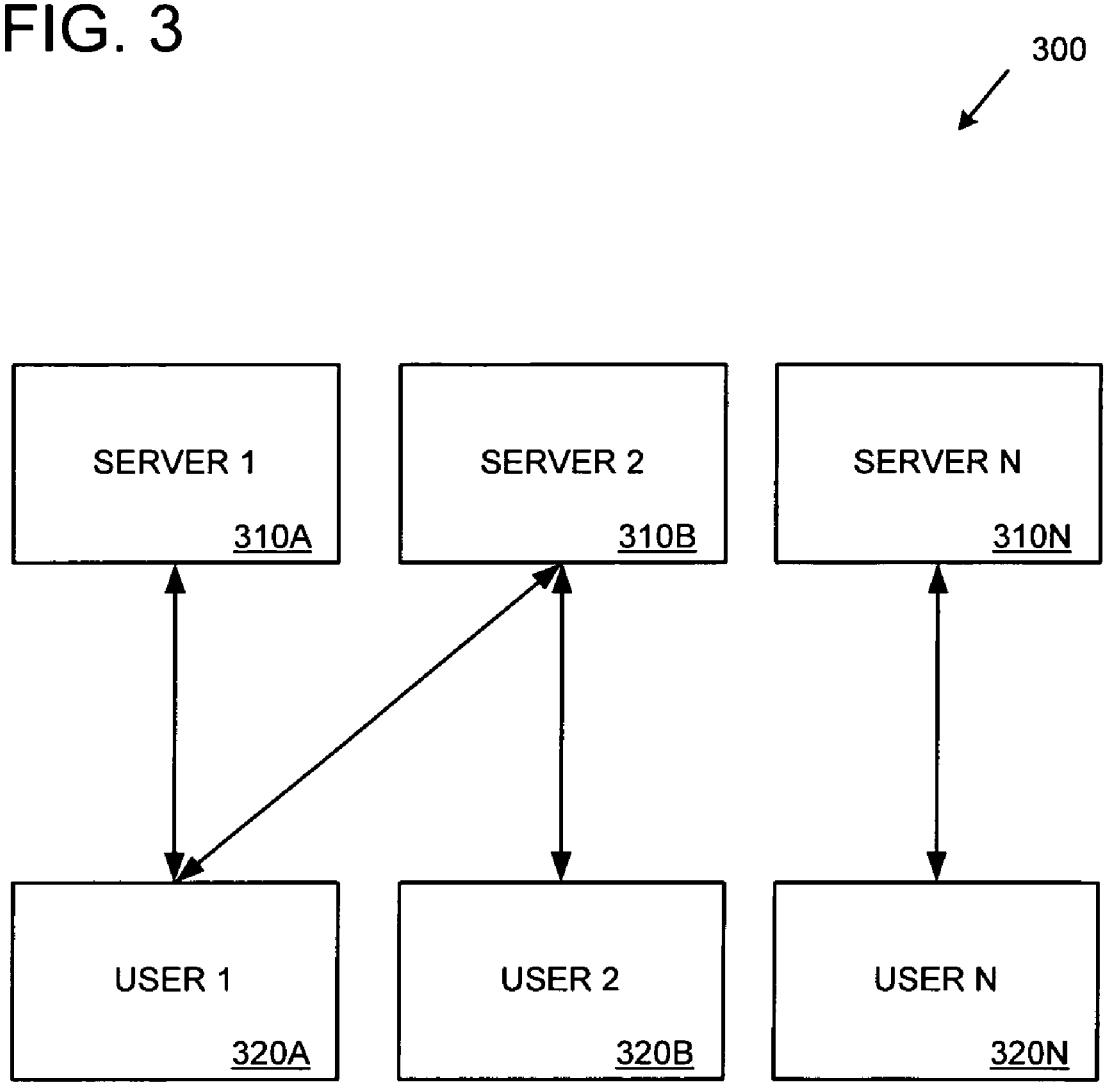
FIG. 3 is a diagram showing an exemplary depiction of user connections.

FIG. 3 shows an exemplary depiction 300 of user connections. In the example, a number of computer servers 310A-N (e.g., servers of a multi-server system) provide services and resources to a number of users 320A-N. In the example, "USER 1" 320A is connected to "SERVER 1" 310A and "SERVER 2" 310B, "USER 2" 320B is connected to "SERVER 2" 310B, and "USER N" 320N is connected to "SERVER N" 310N. Each computer server (e.g., 310A, 310B, and 310N) can support an arbitrary number of connections from an arbitrary number of users (e.g., 320A, 320B, and 320N). Similarly, each user (e.g., 320A, 320B, and 320N) can be connected to an arbitrary number of computer servers (e.g., 310A, 310B, and 310N).

EXAMPLE 19

Exemplary Method for Displaying User Connection Information

Figure 4:
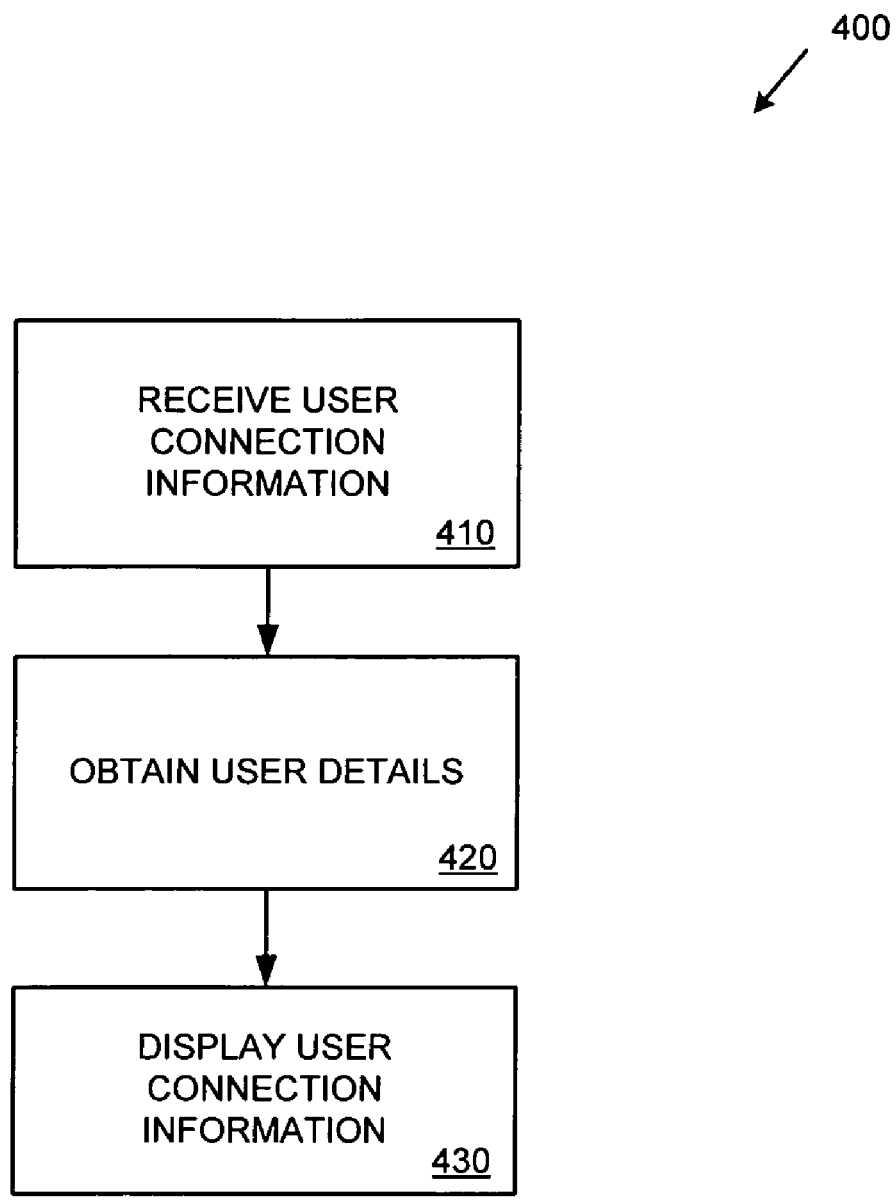
FIG. 4 is a flowchart showing an exemplary method for displaying user connection information.

FIG. 4 shows an exemplary method 400 for displaying user connection information (e.g., for a multi-server system), and can be performed, for example, by a system such as that shown in FIG. 2. At 410, user connection information is received (e.g., at a management computer server of the multi-server system). The user connection information can represent user connections to a number of computer servers (e.g., of the multi-server system). For example, the user connection information can be received from a number of other computer servers. The user connection information can be received from management agents running on the other computer servers (e.g., other computer servers of the multi-server system).

At 420, user details are obtained. The user details can be user details of the user connections comprising the user connection information. For example, user details (e.g., user name, email address, and logon name) can be obtained by looking up (e.g., in a directory service) unique user identifiers contained in the user connection information.

At 430, the user connection information is displayed (e.g., as a representation of the user connection information). The user connection information can be displayed as a list of computer servers (e.g., represented by server names) and the users connected to the computer servers (e.g., count of users and individual logon names).

EXAMPLE 20

Figure 5:
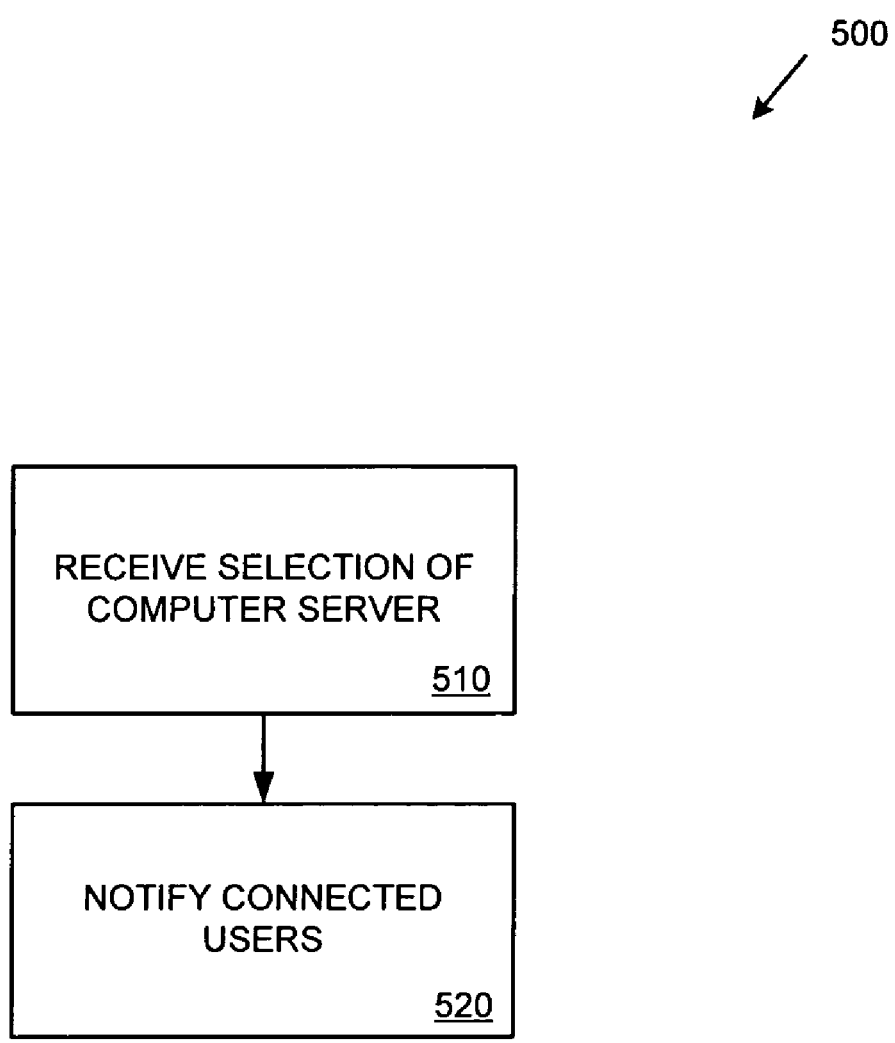
FIG. 5 is a flowchart showing an exemplary method for displaying user connection information for a selected computer server.

Exemplary Method for Displaying User Connection Information for a Selected Computer Server FIG. 5 shows an exemplary method 500 for displaying user connection information for a selected computer server, and can be performed, for example, by a system such as that shown in FIG. 2. At 510, a selection of a computer server is received (e.g., via a user interface of a management application running on a management computer server). The selection of the computer server can be made, for example, from a list of computer servers of a multi-server system displayed in a user interface.

At 520, the users connected to the selected computer server are notified. For example, a user-notification task can be displayed and selected to cause the notification (e.g., by displaying a user interface window in which a notification message can be entered). The users can be notified of an event (e.g., that the selected computer server is going to be shut down for maintenance).

EXAMPLE 21

Exemplary User Interface Depicting a Notification Message

Figure 6:
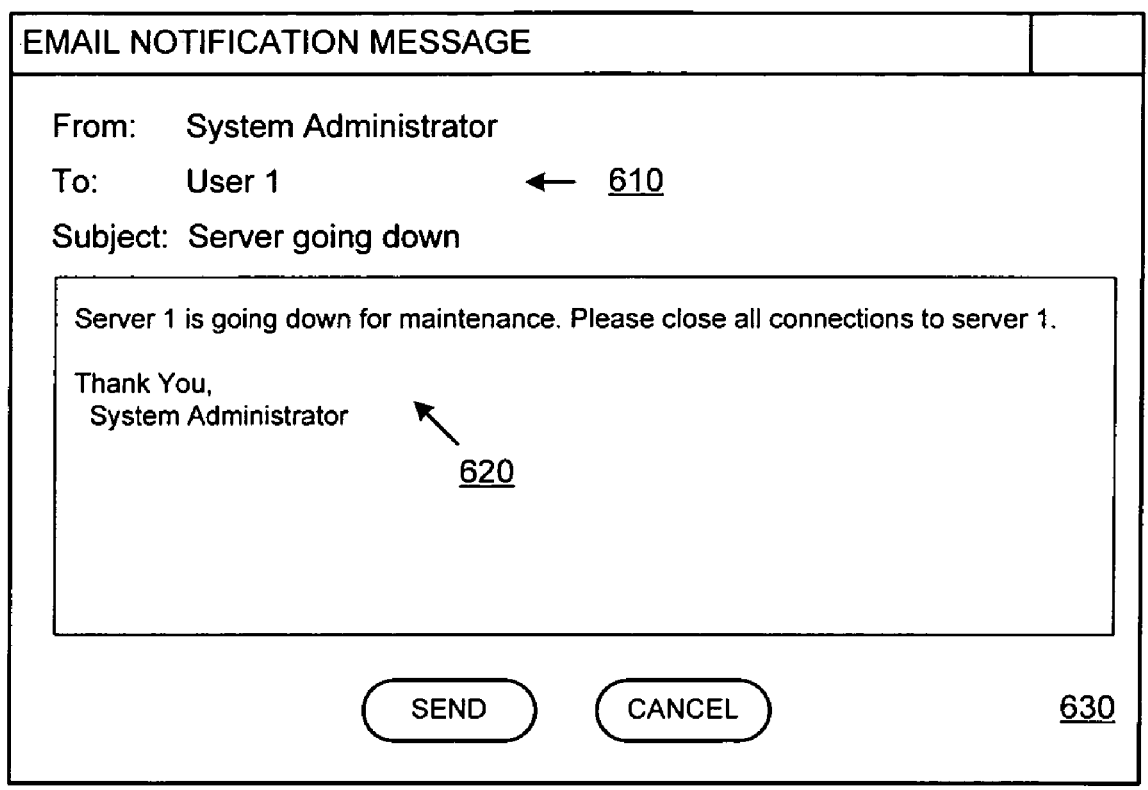
FIG. 6 is a diagram showing an exemplary user interface depicting a notification message.

FIG. 6 shows an exemplary user interface 600 depicting an email notification message 630. The user interface can be displayed, for example, by a system such as that shown in FIG. 2. The user interface 600 can be displayed, for example, as a result of a selection of a user-notification event. In the notification message 630, header information is displayed 610 indicating who the message is from (the system administrator), who the message will be delivered to (a specific user in this case, but it could be any number of users or a group representing a number of users), and the subject of the message (that the server is going to be shut down).

Also displayed in the notification message 630 is a space for entering a message 620 (e.g., an IT administrator can enter a message telling the recipients the reason for the notification).

EXAMPLE 22

Exemplary Method for Notifying Users Connected to Computer Servers

Figure 7:
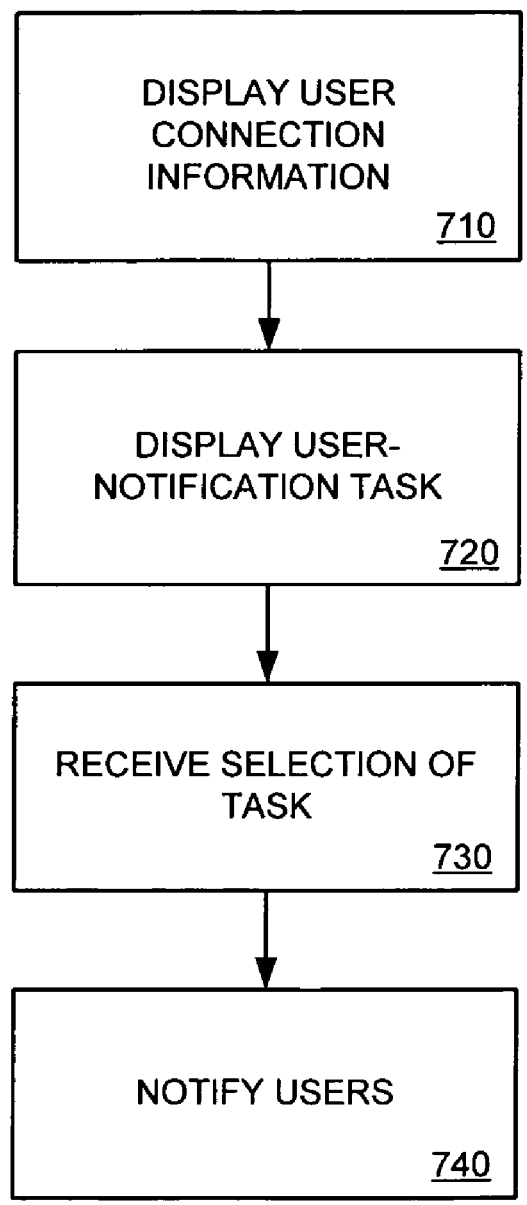
FIG. 7 is a flowchart showing an exemplary method for notifying users connected to computer servers.

FIG. 7 shows an exemplary method 700 for notifying users connected to computer servers, and can be performed, for example, by a system such as that shown in FIG. 2. At 710, user connection information is displayed in a user interface. For example, the user connection information can be displayed in a user interface of a management application. The user connection information can be displayed as a visual representation of the user connection information representing users connected to a number of computer servers of a multi-server system. The users connected to the number of computer servers can be connected to services running on the computer servers, connected to resources provided by the computer servers, or logged in to the computer servers.

At 720, a user-notification task is displayed in the user interface for causing notification of an event to one or more of the users represented by the user connection information. The user-notification task can be associated with a selected entity (e.g., a specific selected computer server from the number of computer servers). If such a specific computer server is selected, then the user-notification can cause notification of the users connected to the selected computer server.

At 730, a selection of the user-notification task is received. For example, a user of the user interface can select a user interface element associated with the user-notification task.

At 740, the one or more users are notified of the event. For example, an email message can be sent to the one or more users. Other notification methods can also be employed (e.g., instant message, alert, pop-up window, page, and phone call).

EXAMPLE 23

Exemplary Method for Retrieving and Displaying User Connection Information

Figure 8:
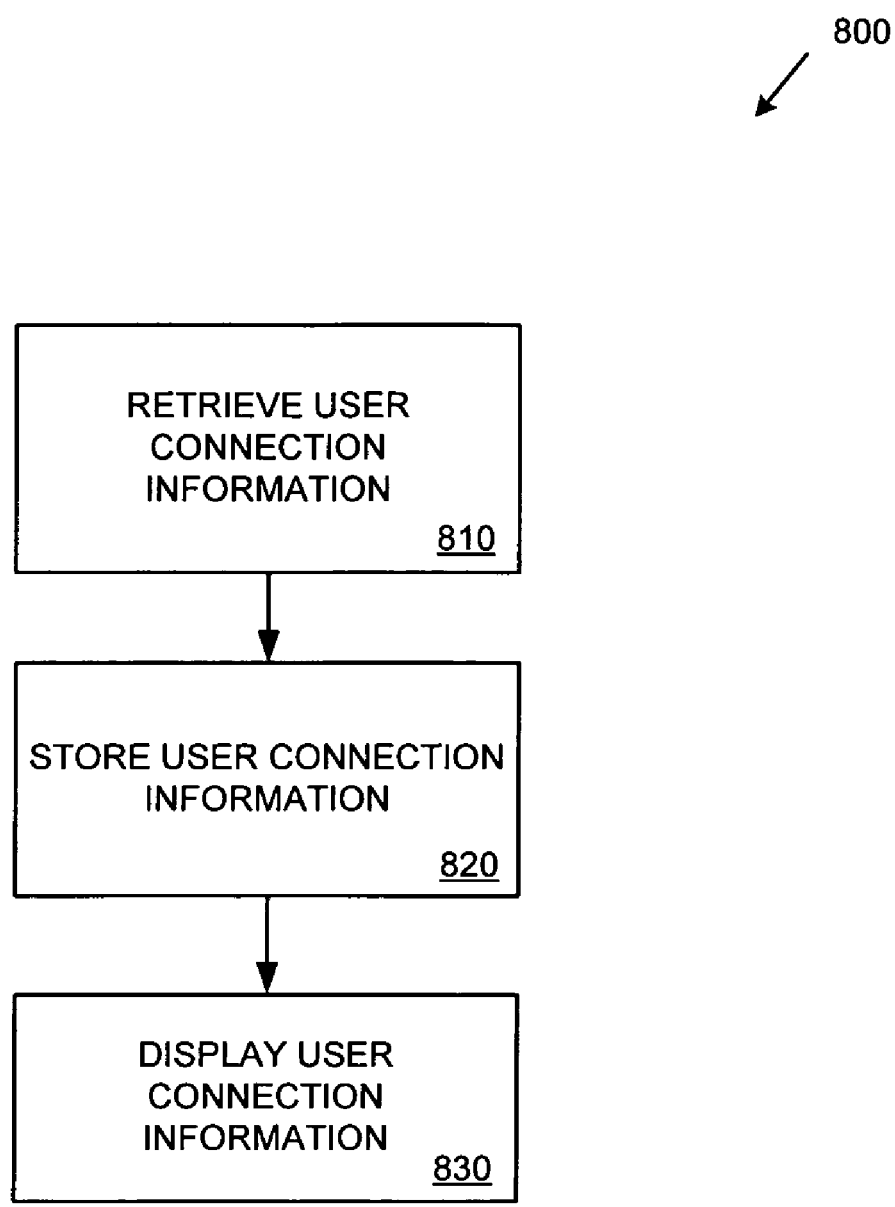
FIG. 8 is a flowchart showing an exemplary method for retrieving and displaying user connection information.

FIG. 8 shows an exemplary method 800 for retrieving and displaying user connection information for users connected to computer servers of a multi-server system, and can be performed, for example, by a system such as that shown in FIG. 2. At 810, user connection information is retrieved from a number of computer servers of the multi-server system. The user connection information can be retrieved by a management computer server. The user connection information can be automatically retrieved on a periodic basis (e.g., at regular time intervals based on a schedule). The time interval can be relatively short, such as at least every 10 minutes.

At 820, the user connection information is stored (e.g., in a database or file). The storage can take place at the management computer server.

At 830, the user connection information is displayed (e.g., in a user interface of a management application running on the management computer server). The user connection information can be displayed as a representation of the user connection information. The stored user connection information can be used for the display. User connection information representing user connections to multiple computer servers can be displayed (e.g., as a list of computer servers and the users who are connected to each, or a list of users and the computer servers to which each is connected).

EXAMPLE 24

Exemplary User Interface Depicting Entity Groups

Figure 9:
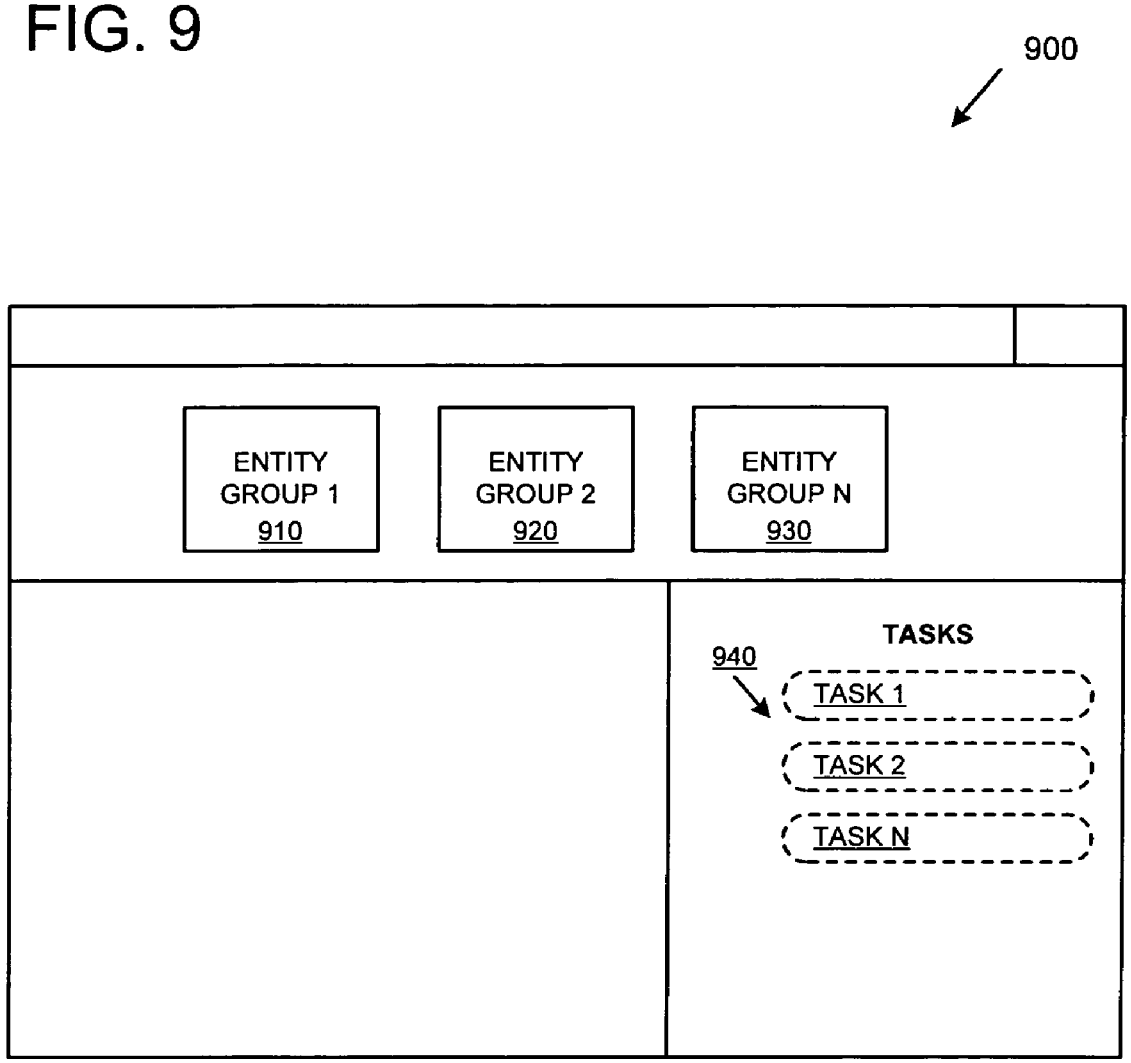
FIG. 9 is a diagram showing an exemplary user interface depicting entity groups.

FIG. 9 shows an exemplary user interface 900 depicting entity groups, and can be displayed, for example, by a system such as that shown in FIG. 2. In the user interface 900, a variable (e.g., arbitrary) number of entity groups can be displayed (e.g., 910, 920, and 930). For example, one of the entity groups (e.g., 910) can be a network entity group. Another of the entity groups (e.g., 920) can be a users entity group. And, another of the entity groups (e.g., 930) can be a licensing entity group.

Also displayed in the user interface 900 is a task list 940 (e.g., a global task list). The task list 940 can comprise a variable (e.g., arbitrary) number of tasks (e.g., one or more tasks). The task list 940 can be represented by a title.

The task list 940 can be displayed and accessed in various ways. For example, the task list 940 can be displayed on a home page of a management application (e.g., a management application running on a management computer server of a multi-server system). The task list 940 can be accessed via a descriptive link or button. For example, the task list 940 can be accessed via a "critical alerts" link or via a "recommended tasks" link (e.g., the links can display a pop-up window containing the task list 940, or the links can cause display of the task list 940 somewhere in the same window).

EXAMPLE 25

Exemplary User Interface Depicting Entities

Figure 10:
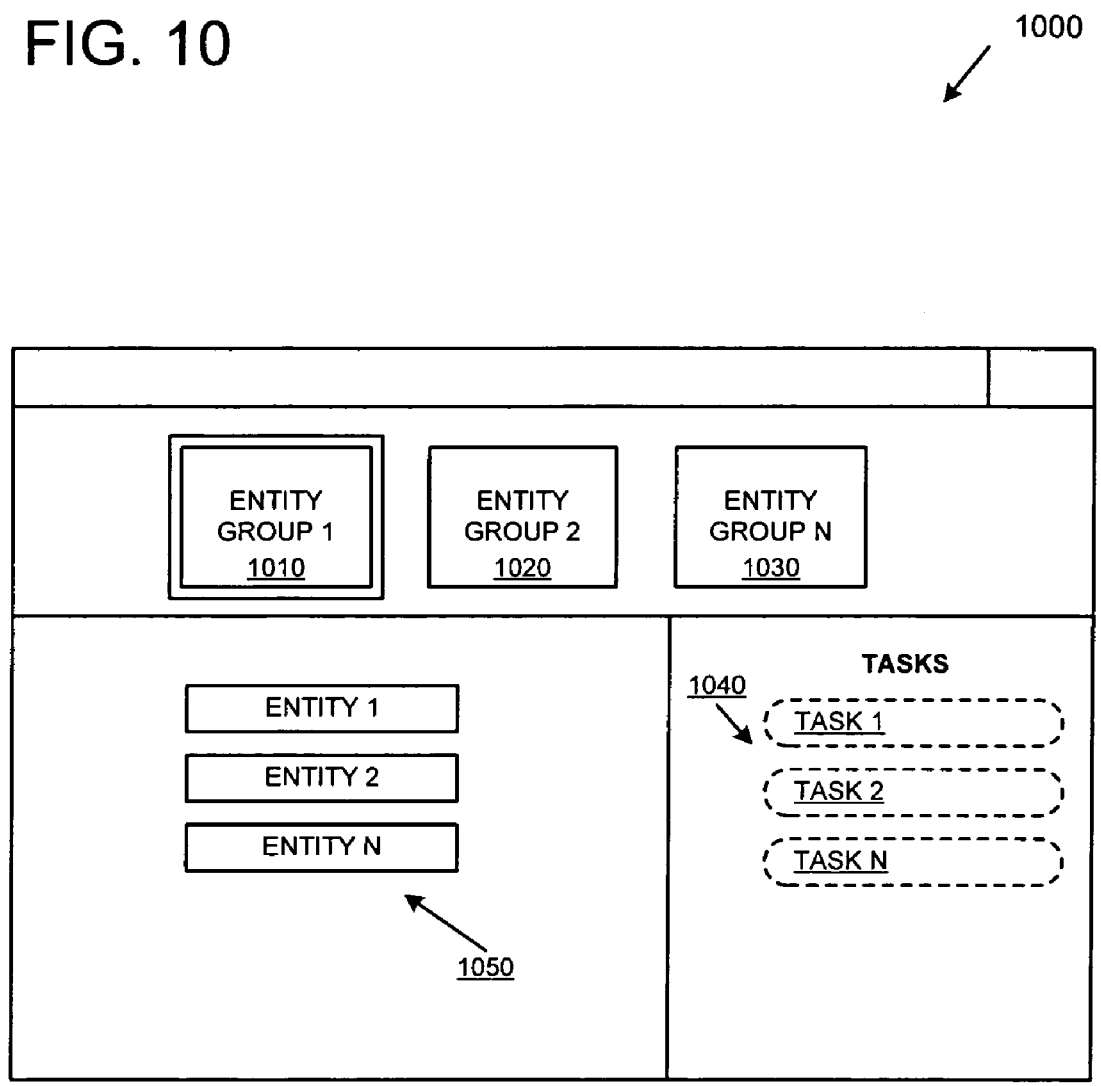
FIG. 10 is a diagram showing an exemplary user interface depicting entities.

FIG. 10 shows an exemplary user interface 1000 depicting entities, and can be displayed, for example, by a system such as that shown in FIG. 2. In the user interface 1000, a variable (e.g., arbitrary) number of entity groups can be displayed (e.g., 1010, 1020, and 1030). For example, one of the entity groups (e.g., 1010) can be a network entity group. Another of the entity groups (e.g., 1020) can be a users entity group. And, another of the entity groups (e.g., 1030) can be a licensing entity group.

A user can select one of the entity groups (e.g., 1010, 1020, and 1030). In the user interface, the user has selected entity group 1010. In response to the selection of entity group 1010, one or more entities 1050 comprising the entity group 1010 are displayed. For example, the selected entity group 1010 can be a users entity group, and the one or more entities 1050 comprising the users entity group can be one or more users (e.g., listed by full name and logon name).

The one or more entities 1050 can be presented in a variety of ways. For example, the entities 1050 can be presented in a list view (e.g., as rows of information). The entities 1050 can also be presented in a topology view (e.g., as a graphical representation of the entities).

In response to a selection of an entity group, a task list (e.g., a scoped task list) can be displayed. In the user interface 1000, the selection of the entity group 1010 has resulted in display of the task list 1040. The task list 1040 can comprise a variable (e.g., arbitrary) number of tasks (e.g., one or more tasks related to the selected entity group 1010). The task list 1040 can be represented by a title (e.g., network tasks, server tasks, user tasks, licensing tasks). The task list can also be displayed in response to a selection of an individual entity (e.g., "ENTITY 1" form the displayed entities 1050), and the tasks of the task list 1040 so displayed can be associated with the selected entity (e.g., scoped to the selected entity).

The task list 1040 can be displayed and accessed in various ways. The task list 1040 can be displayed in separate area of the user interface 1000. The task list 1040 can also be displayed in a pop-up window (e.g., as the result of a user clicking or right-clicking on an entity or entity group). The task list 1040 can be accessed via a descriptive link or button.

EXAMPLE 26

Exemplary User Interface Depicting User Connection Information

Figure 11:
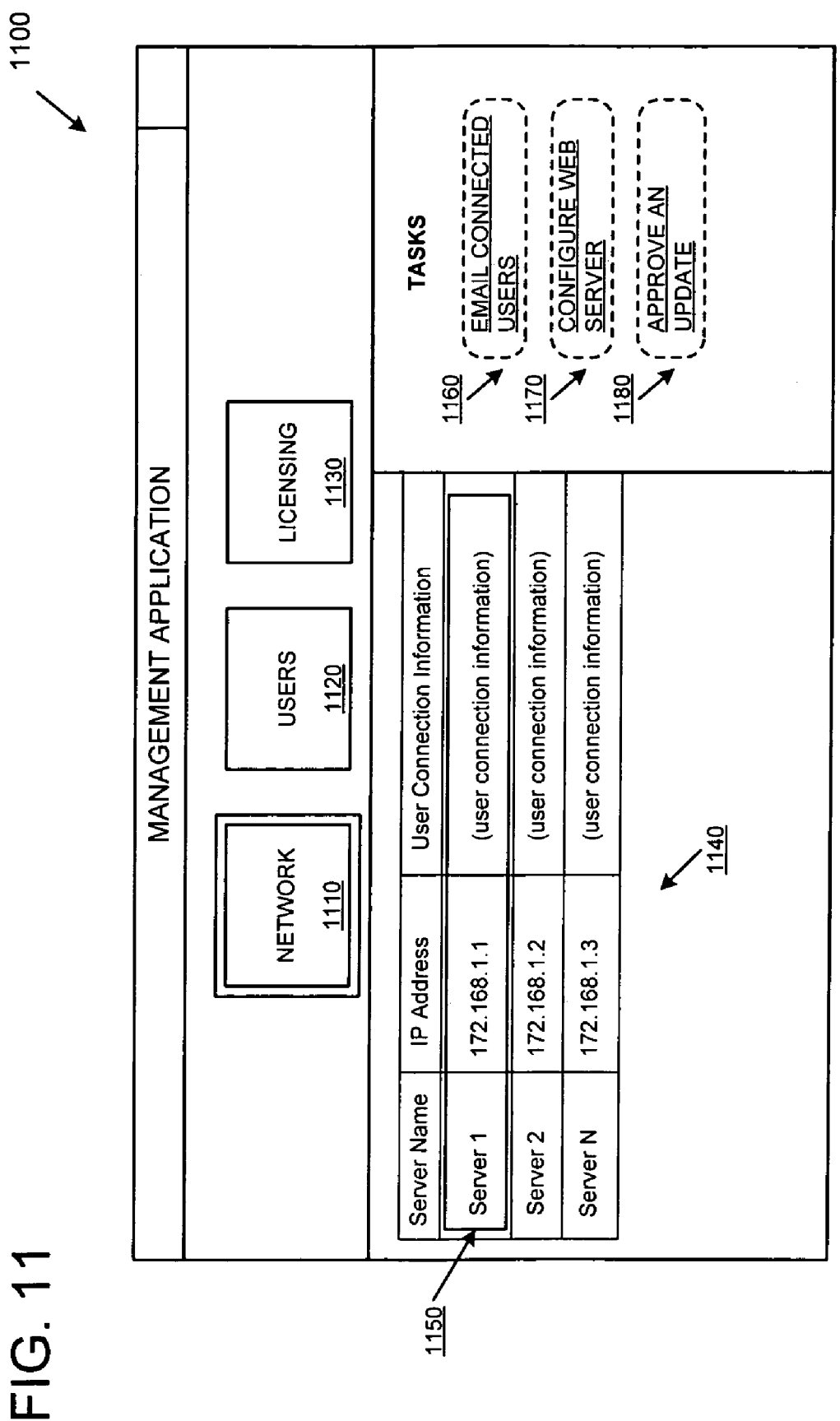
FIG. 11 is a diagram showing an exemplary user interface depicting user connection information.

FIG. 11 shows an exemplary user interface 1100 depicting user connection information. The user interface can be displayed, for example, by a system such as that shown in FIG. 2. In the user interface 1100, a number of entity groups are displayed: a network entity group 1110, a users entity group 1120, and a licensing entity group 1130. In the user interface 1100, the network entity group 1110 has been selected. Based on the selected network entity group 1110, a number of computer server entities 1140 associated with the selected network entity group 1110 are displayed.

The computer server entities 1140 are displayed in a list and are identified by server name and IP address. User connection information representing user connections to the computer server entities can be displayed for each of the computer servers of the list. For example, the user connection information can be displayed by displaying each individual user (e.g., by logon name) connected to each of the displayed computer servers.

In the user interface 1100, computer servers (e.g., individual or multiple computer servers) can be selected. In the user interface 1100, "Server 1" has been selected 1150. In response to the selection, tasks, such as 1160-80, can be displayed (e.g., user-notification tasks). The task can be associated with (e.g., scoped to) the selected computer server 1150. For example, the "EMAIL CONNECTED USERS" user-notification task 1160 can be selected to notify, via email, the users connected to the selected computer server "Server 1" 1150.

EXAMPLE 27

Exemplary User Interface Depicting User Connections to Computer Servers

Figure 12:
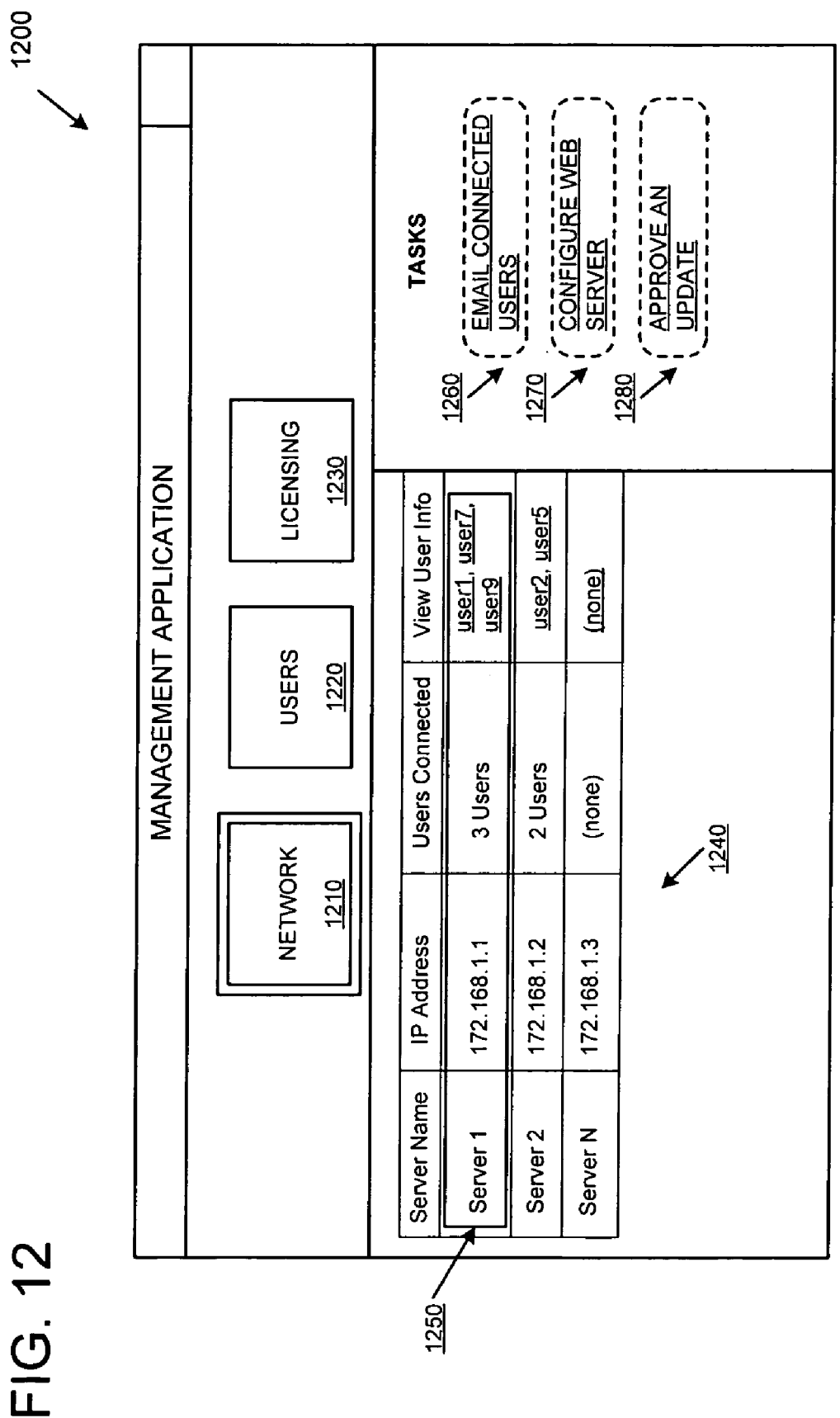
FIG. 12 is a diagram showing an exemplary user interface depicting user connections to computer servers.

FIG. 12 shows an exemplary user interface 1200 depicting user connections to computer servers. The user interface can be displayed, for example, by a system such as that shown in FIG. 2. In the user interface 1200, a number of entity groups are displayed: a network entity group 1210, a users entity group 1220, and a licensing entity group 1230. In the user interface 1200, the network entity group 1210 has been selected. Based on the selected network entity group 1210, a number of computer server entities 1240 associated with the selected network entity group 1210 are displayed.

The computer server entities 1240 are displayed in a list and are identified by server name and IP address. User connection information representing user connections to computer server entities can be displayed for each of the computer servers of the list. In the display 1240, the user connection information is displayed by displaying a count of the number of users connected to each computer server and the logon name of each of the connected users. For example, "Server 1" has three users connected: "user1," "user7," and "user9." An individual user (e.g., "user1") can be selected (e.g., by clicking on the user's logon name) which can cause user details (e.g., user name, email address, group associations) of the selected user to be displayed.

Instead of displaying individual connected users by logon name, a user interface element can be displayed (e.g., a "details" or "users" link) which can cause display of the individual connected users (e.g., by logon name). This technique can be used, for example, if there are a large number of users connected to the computer server, or if available user interface space is limited.

In the user interface 1200, computer servers (e.g., individual or multiple computer servers) can be selected. In the user interface 1200, "Server 1" has been selected 1250. In response to the selection, tasks (e.g., user-notification tasks), such as 1260-80, can be displayed. The task can be associated with (e.g., scoped to) the selected computer server 1250. For example, the "EMAIL CONNECTED USERS" user-notification task 1260 can be selected to notify, via email, the users connected to the selected computer server, in this case connected users: "user1," "user7," and "user9."

EXAMPLE 28

Exemplary User Interface Depicting Users

Figure 13:
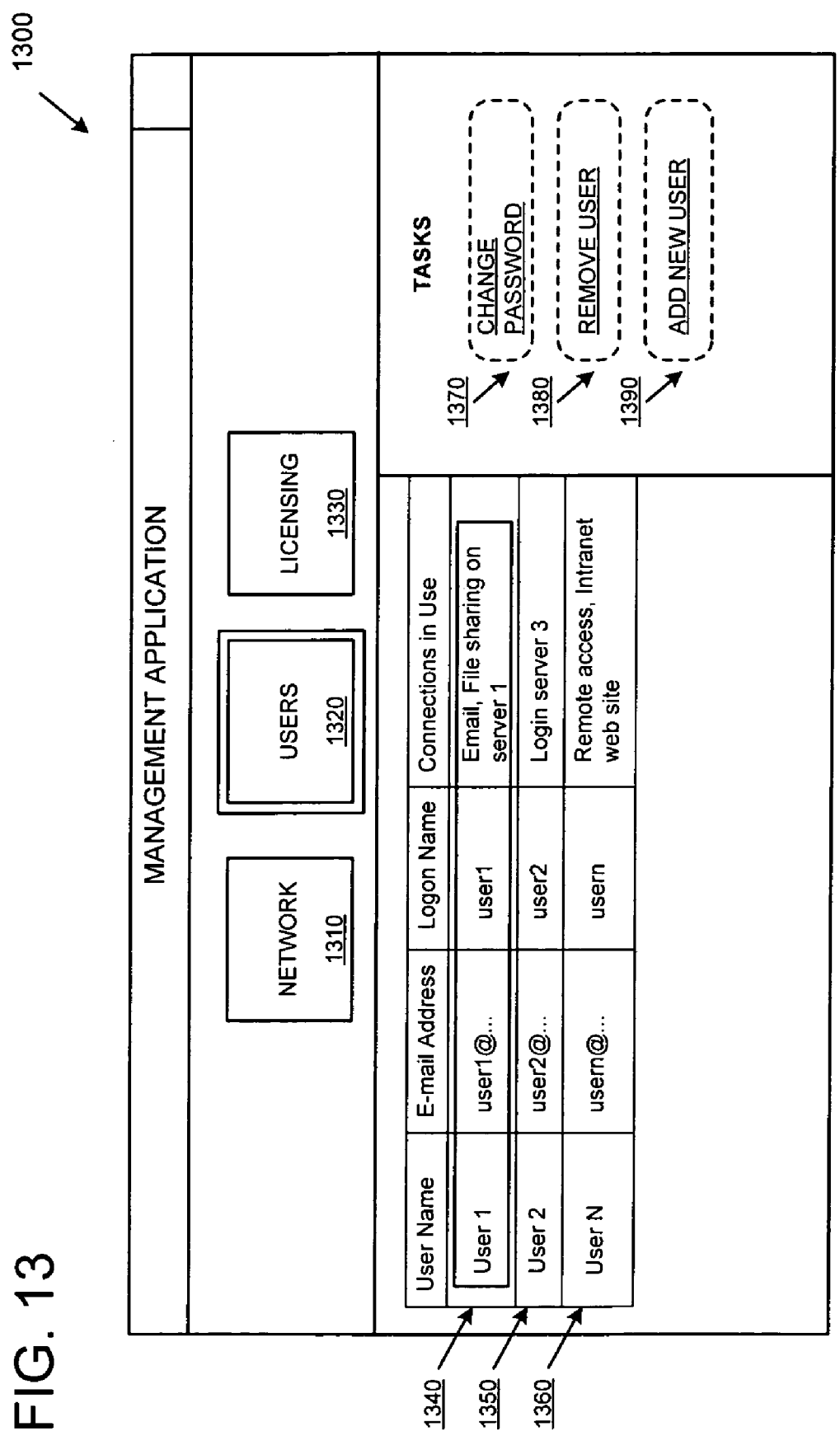
FIG. 13 is a diagram showing an exemplary user interface depicting users.

FIG. 13 shows an exemplary user interface 1300 depicting user connections associated with users. The user interface can be displayed, for example, by a system such as that shown in FIG. 2. In the user interface 1300, a number of entity groups are displayed: a network entity group 1310, a users entity group 1320, and a licensing entity group 1330. In the user interface 1300, the users entity group 1320 has been selected. Based on the selected users entity group 1320, a number of user entities 1340-60 associated with the selected users entity group 1320 are displayed.

The user entities 1340-60 are displayed in a list and are identified by user name, email address, and logon name. User connection information representing user connections to computer servers can be displayed for each of the users of the list. In this exemplary user interface 1300, the user connection information is represented by displaying connections to services running on computer servers, connections to resources provided by computer servers, and login sessions to computer servers. For example, "User 1" is currently connected to the "Email" service (e.g., running on a specific email computer server) and to the file sharing resource on computer server 1. "User 2" is currently logged in to computer server 3. And, "User N" is currently connected to the remote access service (e.g., running on a specific remote access computer server) and the Intranet web site (e.g., running on a specific web computer server).

Instead of displaying each individual connection by a name (e.g., the name of the service or resource), a user interface element can be displayed (e.g., a "details" or "connections" link) which can cause display of the individual connections (e.g., in a pop-up window or a details pane of the same user interface 1300). This technique can be used, for example, if there are many connections, or if available user interface space is limited.

In the user interface 1300, users (e.g., individual or multiple users) can be selected. In the user interface 1300, "User 1" has been selected 1340. In response to the selection, tasks, such as 1370-90, can be displayed. The tasks can be associated with (e.g., scoped to) the selected user 1340. For example, the "CHANGE PASSWORD" task 1370 can be selected to change the password of selected "User 1" 1340.

EXAMPLE 29

Exemplary Task Template Schema

Figure 14:
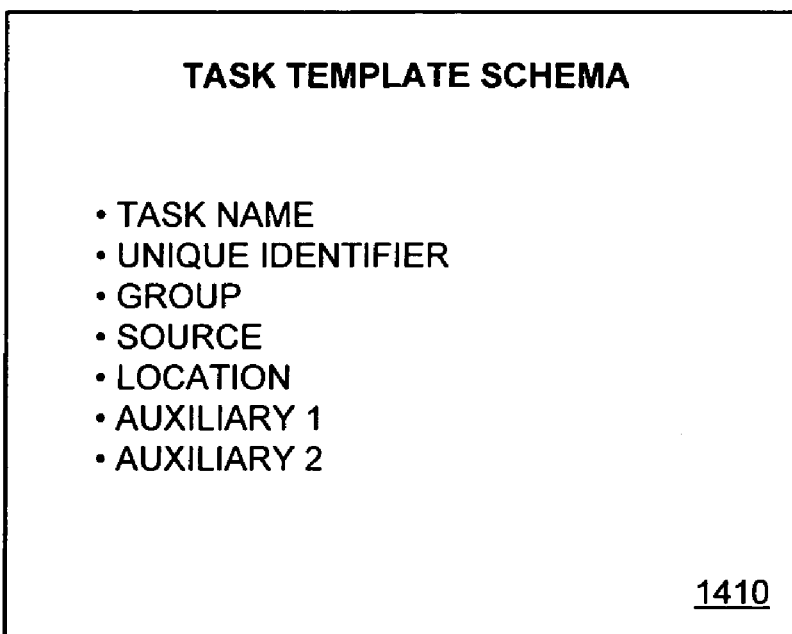
FIG. 14 is a diagram showing an exemplary task template schema.

FIG. 14 shows an exemplary task template schema 1400. The task template schema can comprise various fields 1410. The task template schema can comprise a task name field (e.g., for use when displaying the task template in a user interface for selecting or invoking the task template). The task template schema can comprise a unique identifier field for uniquely identifying the task template. The task template schema can comprise a group identifier for identifying a group of the task template. The task template schema can comprise a source field for identifying a source application. The task template schema can comprise a location identifier field for identifying a user interface of an application (e.g., by way of an API of the application). The task template schema can also comprise auxiliary fields allowing for future expansion of the task template schema.

EXAMPLE 30

Exemplary Task Usage System

Figure 15:
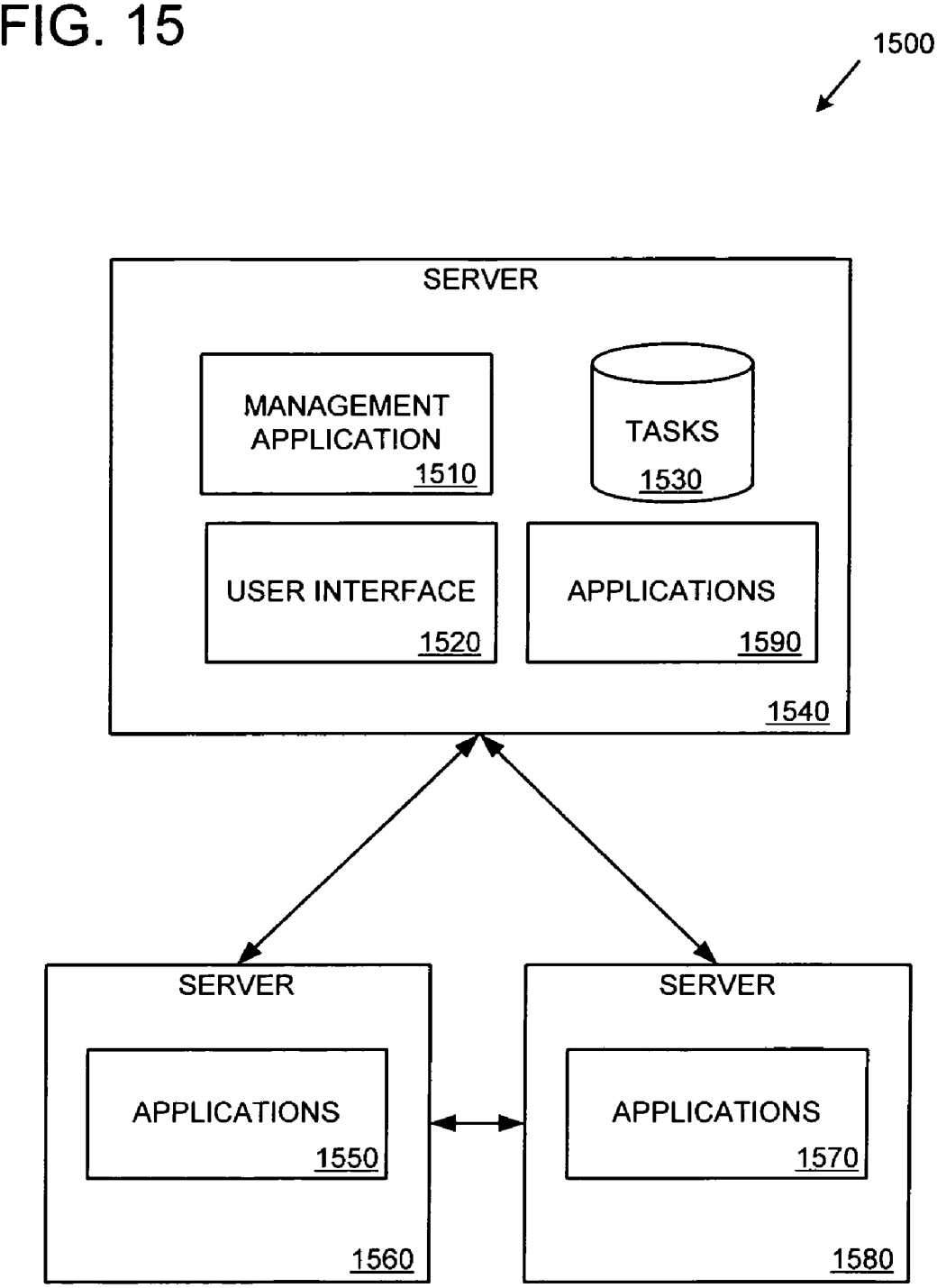
FIG. 15 is a diagram showing an exemplary system for using tasks.

FIG. 15 shows an exemplary system 1500 for using tasks. In the example, a management application 1510 (e.g., a server application) can run on a computer server 1540. For example, the management application 1510 can be an application for managing a collection of applications (e.g., 1550, 1570, and 1590) (e.g., server applications) designed to operate a multi-server computer system (e.g., providing services to a business or organization). The collection of applications (e.g., 1550, 1570, and 1590) can be managed applications. The collection of applications can include, for example, email applications, file serving applications, remote access applications, user management applications, licensing applications, and monitoring applications. Different servers of the multi-server computer system can run different applications from the collection of applications. For example, the multi-server computer system can comprise three servers: a management server (e.g., 1540), an email server (e.g., 1560), and a firewall server (e.g., 1580). The management application 1510 can be located on the management server (e.g., 1540) and manage applications on the same server as well as applications on different servers (e.g., 1560 and 1580).

The management application 1510 can be used to manage servers (e.g., by managing server applications running on the servers) using tasks 1530 (e.g., where the tasks are accomplished by task templates). Tasks 1530 can be stored (e.g., as task templates) in a database on a computer server (e.g., on the same server as the management application, or on a different server). Tasks 1530 can also be stored in other ways (e.g., in a flat file, on removable media, as an XML schema).

The management application 1510 can provide a user interface 1520 allowing a user to access tasks 1530 (e.g., to access task templates for accomplishing the tasks). For example, the user interface 1520 of the management application 1510 can display tasks 1530 (e.g., displayed as user interface elements for initiating the tasks) in a variety of forms, such as a global task list or a scoped task list. The user interface 1520 can also display objects, entities, and entity groups. For example, a user can select an object, entity, or entity group from the user interface 1520 to display scoped tasks.

From the user interface 1520, a user can select (e.g., invoke) a task 1530 (e.g., by selecting a user interface element for initiating the task) to manage (e.g., display information from, make a change to) an application (e.g., a managed application). For example, the user can select a task 1530 to manage applications 1590 on the same computer server 1540 that the management application 1510 is operating on. The user can also select a task 1530 to manage an application on a different computer server (e.g., manage applications 1550 on a computer server 1560, or manage applications 1570 on computer server 1580).

The user interface 1520 can also support different options, procedures, or techniques for navigating to tasks 1530 (e.g., navigating to task templates associated with, and used to accomplish, the tasks). For example, the user interface 1520 can support an option for navigating to a task by displaying a global task (e.g., displaying a global task on a home page of the user interface 1520 where the user has not selected an object, entity, or entity group). The user interface 1520 can support an option for navigating to a task based on a selection of an object, entity, or entity group and then displaying a scoped task.

EXAMPLE 31

Exemplary Server Applications

In any of the examples herein, server applications can be any software installed on a computer server. For example, server applications can include any server application offering a service for use by a client. In practice, such server applications can include file sharing services, email servers, licensing services, directory services, firewall services, anti-spam services, anti-virus detection services, networking services (e.g., services for managing identities and relationships that make up a network), and the like.

Server applications can also include operating system programs, such as an operating system, operating system enhancements, or both.

EXAMPLE 32

Exemplary Multi-Server System for Performing Tasks

Figure 16:
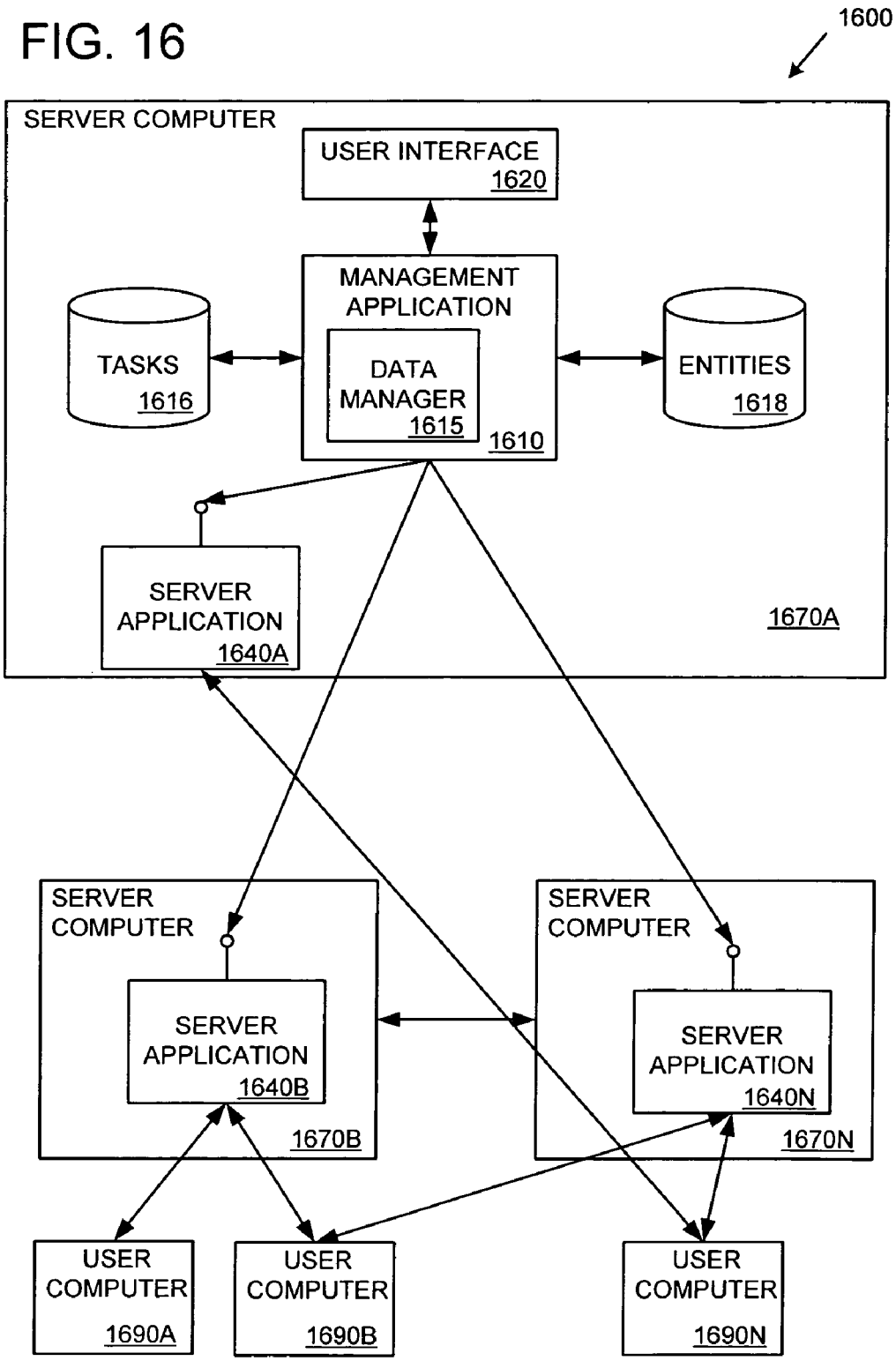
FIG. 16 is a diagram showing an exemplary multi-server system for performing tasks.

FIG. 16 shows an exemplary multi-server system 1600 for performing tasks. In the example, a management application 1610 (e.g., a server application) can run on a computer server 1670A. For example, the management application can comprise a data manager 1615 for managing a number of computer servers by managing server applications on the computer servers (e.g., server application 1640A on server 1670A, server application 1640B on server 1670B, and server application 1640N on server 1670N).

The server applications (1640A-1640N) can include, for example, server applications for providing computer services to a business or organization, such as: email applications, file serving applications, remote access applications, user management applications, licensing applications, anti-virus applications, and monitoring applications. Different servers of the multi-server system can perform specific services for a business or organization by running different server applications. For example, the multi-server system can comprise three servers: a management server (e.g., 1670A) running a file service application (e.g., 1640A), an email server (e.g., 1670B) running an email application (e.g., 1640B), and a firewall server (e.g., 1670N) running an anti-virus application (e.g., 1640N).

The data manager 1615 can manage a server application (e.g., 1640A, 1640B, or 1640N) on a server (e.g., 1670A, 1670B, or 1670N) by communicating with an API of the server application. For example, a user management server application can provide an API for displaying various user interfaces within the user management application (e.g., a user interface for adding users, a user interface for deleting users, and a user interface for resetting a user's password).

The management application 1610 can provide a user interface 1620 allowing a user to manage the servers and applications of the multi-server system 1600 using tasks 1616. For example, the user interface 1620 of the management application 1610 can display tasks 1616 (e.g., displayed as user interface elements for initiating the tasks) in a variety of forms, such as a global task list or a scoped task list. The user interface 1620 can also display entities and entity groups (e.g., from an entities database 1618). For example, a user can select an entity or entity group from the user interface 1620 to display scoped tasks.

The tasks 1616 can be stored (e.g., as task templates) in a database. The task templates can be used to accomplish (e.g., complete) a task by directing a user to a user interface for accomplishing the task. For example, a task template can comprise a location variable, where the location variable represents a user interface of a server application by way of an API of the server application.

For example, the management application 1610 can display, in the user interface 1620, an entity from the entities database 1618, receive a selection of the entity from a user, display a task from the tasks database 1616, and receive a selection of the task from the user. The management application 1610 can then, via the data manager 1615, using a location variable from a task template associated with the selected task, connect to an API of a server application (e.g., 1640A, 1640B, or 1640N) and display a user interface which the user can then use to complete the selected task.

Server applications (e.g., 1640A-N) can also provide services (e.g., email services, file sharing services, user services) to user computers (e.g., 1690A-N).

EXAMPLE 33

Exemplary Computing Environment

Figure 17:
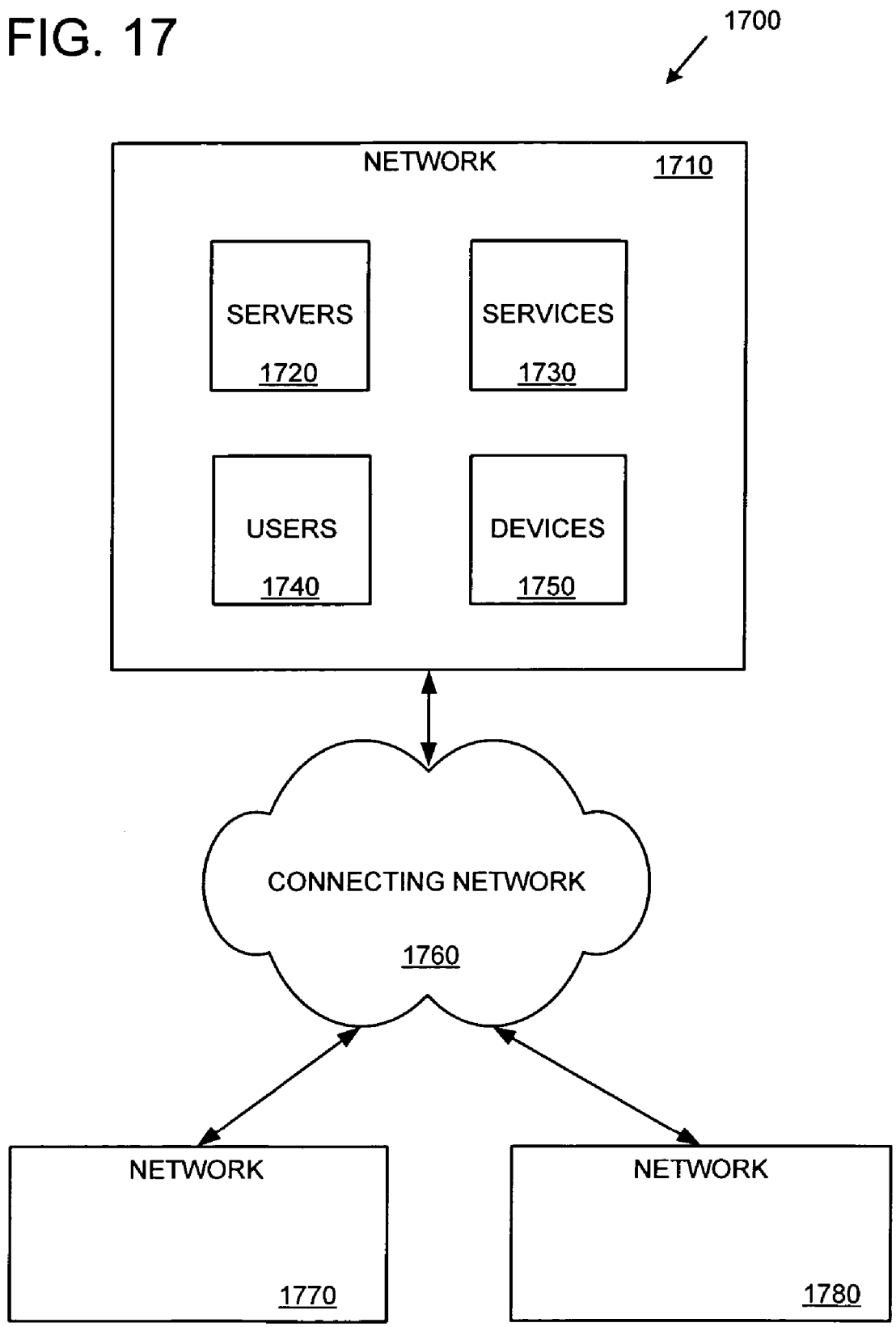
FIG. 17 is a block diagram illustrating an example of a computing environment that can be used to implement any of the technologies described herein.

FIG. 17 illustrates an example computing environment 1700 that can be used to implement any of the technologies described herein. The computing environment includes a network 1710. The network 1710 can comprise servers 1720 (e.g., computer servers), services 1730 (e.g., computer services), users 1740 (e.g., general computer users, IT administrators, employees), and devices 1750 (e.g., desktop or laptop computers, printers, copiers, scanners).

The network 1710 can connect to other networks, such as 1770 and 1780 through connecting network 1760. For example, the connecting network 1760 can comprise a wide area network such as the Internet or a local network. The connecting network can comprise various network hardware, protocols, and topologies.

EXAMPLE 34

Exemplary General Purpose Computer System

Figure 18:
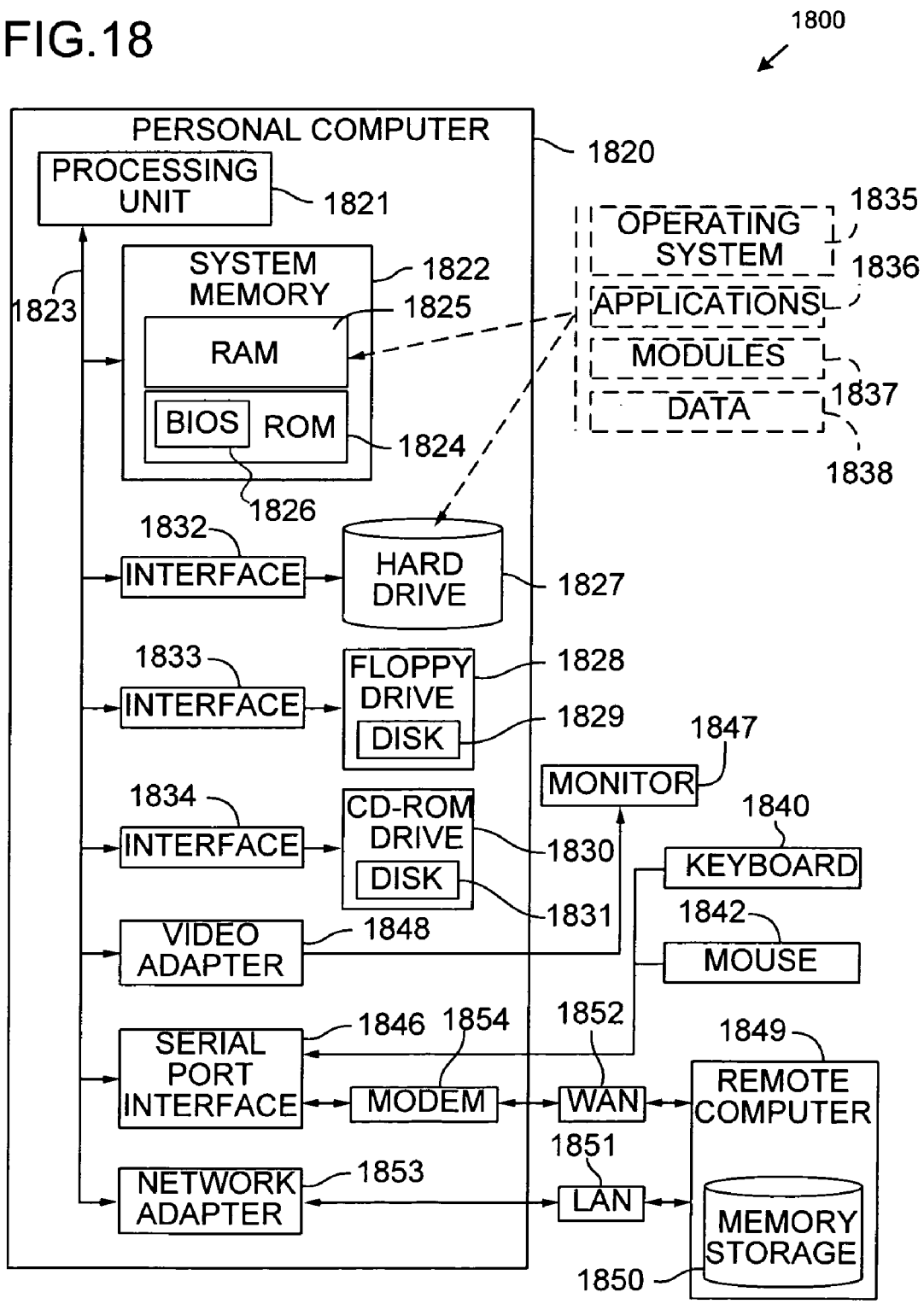
FIG. 18 is block diagram illustrating an example of a computer system that can be used to implement any of the technologies described herein.

FIG. 18 illustrates an example of a computer system 1800 that can be used to implement any of the technologies described herein. The computer system includes a personal computer 1820, including a processing unit 1821, a system memory 1822, and a system bus 1823 that interconnects various system components including the system memory to the processing unit 1821. The system bus may comprise any of several types of bus structures including a memory bus or memory controller, a peripheral bus, and a local bus using a bus architecture such as PCI, VESA, Microchannel (MCA), ISA and EISA, to name a few. The system memory includes read only memory (ROM) 1824 and random access memory (RAM) 1825. A basic input/output system 1826 (BIOS), containing the basic routines that help to transfer information between elements within the personal computer 1820, such as during start-up, is stored in ROM 1824. The personal computer 1820 further includes a hard disk drive 1827, a magnetic disk drive 1828, e.g., to read from or write to a removable disk 1829, and an optical disk drive 1830, e.g., for reading a CD-ROM disk 1831 or to read from or write to other optical media. The hard disk drive 1827, magnetic disk drive 1828, and optical disk drive 1830 are connected to the system bus 1823 by a hard disk drive interface 1832, a magnetic disk drive interface 1833, and an optical drive interface 1834, respectively. The drives and their associated computer-readable media provide nonvolatile storage of data, data structures, computer-executable instructions (program code such as dynamic link libraries, and executable files), etc. for the personal computer 1820. Although the description of computer-readable media above refers to a hard disk, a removable magnetic disk and a CD, it can also include other types of media that are readable by a computer, such as magnetic cassettes, flash memory cards, digital video disks, Bernoulli cartridges, and the like.

A number of program modules may be stored in the drives and RAM 1825, including an operating system 1835, one or more application programs 1836, other program modules 1837, and program data 1838. A user may enter commands and information into the personal computer 1820 through a keyboard 1840 and pointing device, such as a mouse 1842. Other input devices (not shown) may include a microphone, joystick, game pad, satellite dish, scanner, or the like. These and other input devices are often connected to the processing unit 1821 through a serial port interface 1846 that is coupled to the system bus, but may be connected by other interfaces, such as a parallel port, game port or a universal serial bus (USB). A monitor 1847 or other type of display device is also connected to the system bus 1823 via an interface, such as a display controller or video adapter 1848. In addition to the monitor, personal computers typically include other peripheral output devices (not shown), such as speakers and printers.

The personal computer 1820 may operate in a networked environment using logical connections to one or more remote computers, such as a remote computer 1849. The remote computer 1849 may be a server, a router, a peer device or other common network node, and typically includes many or all of the elements described relative to the personal computer 1820, although only a memory storage device 1850 has been illustrated in FIG. 18. The logical connections depicted in FIG. 18 include a local area network (LAN) 1851 and a wide area network (WAN) 1852. Such networking environments are commonplace in offices, enterprise-wide computer networks, intranets and the Internet.

When used in a LAN networking environment, the personal computer 1820 is connected to the local network 1851 through a network interface or adapter 1853. When used in a WAN networking environment, the personal computer 1820 typically includes a modem 1854 or other means for establishing communications over the wide area network 1852, such as the Internet. The modem 1854, which may be internal or external, is connected to the system bus 1823 via the serial port interface 1846. In a networked environment, program modules depicted relative to the personal computer 1820, or portions thereof, may be stored in the remote memory storage device. The network connections shown are merely examples and other means of establishing a communications link between the computers may be used.

EXAMPLE 35

Exemplary Automated Methods

Any of the methods described herein can be performed via one or more computer-readable media having computer-executable instructions for performing such methods. Operation can be fully automatic, semi-automatic, or involve manual intervention.

EXAMPLE 36

Exemplary Combinations

The technologies of any example described herein can be combined with the technologies of any one or more other examples described herein.

EXAMPLE 37

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer implemented method for displaying user connection information for a multi-server system, the method comprising:
    receiving, at a management computer server of the multi-server system from a plurality of computer servers of the multi-server system, user connection information for one or more users of the multi-server system, wherein the user connection information represents user connections to the plurality of computer servers of the multi-server system, wherein the user connection information for the one or more users of the multi-server system is received at the management computer server from management software agents located at the plurality of computer servers of the multi-server system, wherein the management software agents automatically collect the user connection information for their respective computer servers and deliver the collected user connection information to the management computer server, and wherein the user connection information is received from the plurality of computer servers on a regular interval basis defined by a pre-set schedule;
    after receiving the user connection information, obtaining one or more user details of the one or more users; and
    displaying, in a user interface of a management application running on the management computer server, a representation of the user connection information for the plurality of computer servers, wherein displaying the representation of the user connection information comprises, for the one or more users:
        displaying at least a logon name of the user; and
        displaying at least names representing services to which the user is currently connected, wherein the services to which the user is currently connected are obtained from the user connection information.

2. The method of claim 1 further comprising:
    displaying, in the user interface, a user-notification task, wherein the user-notification task is selectable by a user of the user interface to notify the one or more users.

3. The method of claim 1 further comprising:
    receiving, via the user interface, a selection of a computer server from the plurality of computer servers; and responsive to the selection of the computer server, displaying, in the user interface, a user-notification task, wherein the user-notification task is selectable, by a user of the user interface, to notify users connected to the selected computer server of an event.

4. The method of claim 1 further comprising:
automatically notifying users connected to at least one computer server of the plurality of computer servers of an event.

5. The method of claim 1 wherein displaying the representation of the user connection information comprises, for the plurality of computer servers:
displaying at least a server name of the computer server; and
displaying a number of users connected to the computer server.

6. The method of claim 1 further comprising:
after receiving the user connection information, persistently storing the user connection information at the management computer server, wherein the user connection information comprises start times and end times of the user connections to the plurality of computer servers.

7. The method of claim 1 wherein the user connection information comprises unique user identifiers for uniquely identifying the one or more users.

8. The method of claim 7 wherein the one or more user details are obtained from a directory service of the multi-server system using the unique user identifiers.

9. The method of claim 1 wherein the user connection information comprises connections of the one or more users to services and resources of the plurality of computer servers of the multi-server system.

10. A computer implemented method for notifying users connected to computer servers of a multi-server system, the method comprising:
displaying, in a user interface of a management application running on a management computer server, a visual representation of user connection information representing users connected to a plurality of computer servers of the multi-server system, wherein the user connection information is received at the management computer server of the multi-server system from the plurality of computer servers of the multi-server system, wherein the user connection information is received at the management computer server from management software agents located at the plurality of computer servers of the multi-server system, wherein the management software agents automatically collect the user connection information for their respective computer servers and deliver the collected user connection information to the management computer server, wherein the user connection information is received from the plurality of computer servers on a regular interval basis defined by a pre-set schedule, and wherein displaying the visual representation of the user connection information comprises, for the users:
displaying at least a logon name of the user; and
displaying at least names representing services to which the user is currently connected, wherein the services to which the user is currently connected are obtained from the user connection information;
displaying, in the user interface, a user-notification task for causing one or more users of the users connected to the plurality of computer servers to be notified of an event;
receiving, from a user via the user interface, a selection of the user-notification task; and
in response to receiving the selection of the user-notification task, notifying the one or more users of the event.

11. The method of claim 10 further comprising:
receiving, from the user via the user interface, a selection of a computer server from the plurality of computer servers;
wherein the user-notification task is displayed in response to receiving the selection of the computer server, and wherein the one or more users are connected to the selected computer server.

12. The method of claim 11 wherein the one or more users are connected to a service provided by the selected computer server and are connected to a resource of the selected computer server.

13. The method of claim 10 wherein notifying the one or more users of the event comprises sending an email message to the one or more users.

14. A computer implemented method for retrieving and displaying updated user connection information for users connected to computer servers of a multi-server system, the method comprising:
retrieving, by a management computer server of the multi-server system, user connection information from a plurality of computer servers of the multi-server system, wherein the user connection information from the plurality of computer servers is retrieved by the management computer server from management software agents located at the plurality of computer servers of the multi-server system, wherein the management software agents automatically collect the user connection information for their respective computer servers for retrieval by the management computer server, and wherein the user connection information is retrieved from the plurality of computer servers on a regular interval basis defined by a pre-set schedule;
storing the retrieved user connection information at the management computer server; and
displaying, in a user interface of a management application running on the management computer server, a representation of the user connection information for the plurality of computer servers based on the stored user connection information, wherein displaying the representation of the user connection information comprises, for the users:
displaying at least a logon name of the user; and
displaying at least names representing services to which the user is currently connected, wherein the services to which the user is currently connected are obtained from the user connection information.

15. The method of claim 14 wherein the user connection information comprises:
a listing of users;
a listing of services running on the plurality of computer servers; and
associations between users of the listing of users and services of the listing of services.

16. The method of claim 14 wherein retrieving the user connection information from the plurality of computer servers comprises connecting to a plurality of services running on the plurality of computer servers.

* * * * *